(12) United States Patent
Zhao et al.

(10) Patent No.: US 11,888,531 B1
(45) Date of Patent: Jan. 30, 2024

(54) POLARIZATION INDEPENDENT DQPSK DEMODULATION INTEGRATED OPTICAL CHIP

(71) Applicant: BEIJING ZHONGKE GUOGUANG QUANTUM TECHNOLOGY CO., LTD., Beijing (CN)

(72) Inventors: Yibo Zhao, Beijing (CN); Dong Wang, Beijing (CN); Dongsheng Chen, Beijing (CN)

(73) Assignee: BEIJING ZHONGKE GUOGUANG QUANTUM TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/370,492

(22) Filed: Sep. 20, 2023

(30) Foreign Application Priority Data

Sep. 23, 2022 (CN) .......................... 202211166742.2

(51) Int. Cl.
*H04B 10/61* (2013.01)
*G02B 6/27* (2006.01)

(52) U.S. Cl.
CPC ........... *H04B 10/614* (2013.01); *G02B 6/272* (2013.01); *G02B 6/2773* (2013.01); *H04B 10/612* (2013.01); *H04B 10/6151* (2013.01)

(58) Field of Classification Search
CPC .......................... H04B 10/614; H04B 10/612; H04B 10/6151; G02B 6/272; G02B 6/2773
USPC ......................................................... 398/214
See application file for complete search history.

(56) References Cited

U.S. PATENT DOCUMENTS

| 8,526,830 | B2* | 9/2013 | Frisken | H04B 10/614 398/152 |
| 11,757,534 | B1* | 9/2023 | Zhao | H04B 10/677 398/202 |
| 2011/0261437 | A1* | 10/2011 | Chen | H04B 10/677 359/325 |
| 2012/0093457 | A1* | 4/2012 | Sakamaki | H04B 10/65 385/14 |

FOREIGN PATENT DOCUMENTS

CN 114900245 A 8/2022

OTHER PUBLICATIONS

Li et al; Self-Coherent Receiver for PolMUX Coherent Signals ; 2011; OSA; pp. 1-3. (Year: 2011).*
Yin et al; DLI-Based DP-QPSK Reception Scheme for Short-Range Optical Communication; 2020; MDPI Applied Sciences; pp. 1-12. (Year: 2020).*
Zhang et al; Crystal-based DPSK and DQPSK Demodulators Using PBI ; 2009 ; pp. 1-3. (Year: 2009).*

* cited by examiner

*Primary Examiner* — Amritbir K Sandhu
(74) *Attorney, Agent, or Firm* — COOPER LEGAL GROUP, LLC

(57) ABSTRACT

The application discloses a polarization independent DQPSK demodulation integrated optical chip, which comprises a first beam splitter, a first polarization beam splitter rotator, a second beam splitter, a third beam splitter, a first quarter-wave plate, a first delayed optical waveguide, and a second polarization beam splitter rotator that are integrated on a same substrate.

12 Claims, 3 Drawing Sheets

POLARIZATION INDEPENDENT DQPSK DEMODULATION INTEGRATED OPTICAL CHIP

CROSS-REFERENCE TO RELATED APPLICATION

The present application claims the priority benefits of China application No. 202211166742.2, filed on Sep. 23, 2022. The entirety of China application No. 202211166742.2 is hereby incorporated by reference herein and made a part of this specification.

TECHNICAL FIELD

The present application relates to a technical field of optical communication technology, and in particular, relates to a polarization independent DQPSK demodulation integrated optical chip.

BACKGROUND ART

Differential quadrature phase shift keying, DQPSK, modulation has higher tolerance for noise, nonlinear effects, and coherent crosstalk, and it is very suitable for an application in an optical communication system with a high transmission rate and a high anti-interference performance Conventional DQPSK demodulation requires two sets of DPSK demodulation devices, such as two delay interferometers, to complete the demodulation of I component and Q component, so that volume of a receiving device is larger, cost and complexity are higher.

In response to above problems, there is a solution in prior art that only requires a delay interferometer, which requires a polarization state of an optical signal entering the interferometer to be a 45° linear polarization. However, due to the fact that the polarization of a signal optical becomes random after being transmitted to a receiving end through a fiber channel, therefore, the scheme requires a real-time polarization calibration. In the other technical solution of the prior art, a delay interferometer is used to demodulate polarization independent I component and Q component, but the solution requires four sets of balanced detectors, thereby increasing a difficulty and complexity of subsequent amplification and other processing of an electrical signal, leading to an increase in system costs.

In addition, the existing technologies mentioned above are all implemented based on free space devices, and the large size is not conducive to chip integration. In existing integrated optical chip solutions, a first solution, although using a silicon based delay interferometer to implement chip integration, which requires a polarization controller to calibrate an incident polarization state, and heavily depends on a polarization disturbance rate; a second solution is to use a polarization diversity technology, which divides the signal optical into two components with polarization perpendicular to each other for a delayed self-interference, and compares or sums the electrical signal, a service data loaded by the signal is restored. However, the polarization diversity technology requires two pairs of delay interferometers and an additional electronic processing module, increasing the system complexity.

SUMMARY

In response to the above defects in existing technologies, the present application provides a polarization independent DQPSK demodulation integrated optical chip.

A first polarization independent DQPSK demodulation integrated optical chip of the present application, which comprises a first beam splitter, a first polarization beam splitter rotator, a second beam splitter, a third beam splitter, a first quarter-wave plate, a first delayed optical waveguide, and a second polarization beam splitter rotator, all of which are integrated on a same substrate, two output ports of the first beam splitter are respectively connected to the two input ports of the first polarization beam splitter rotator through an optical waveguide L1 and an optical waveguide L2; wherein the two output ports of the first polarization beam splitter rotator are respectively connected to one of the two input ports of the second beam splitter and the third beam splitter through the optical waveguide; two input ports of the second polarization beam splitter rotator are respectively connected to one of the two input ports of the second beam splitter and the third beam splitter through the optical waveguide; two output ports of the second beam splitter are respectively connected to two output ports of the third beam splitter through the first quarter-wave plate and the first delayed optical waveguide, and forming a delay interferometer;

the first beam splitter is configured to split an input to generate a first signal optical component and a second signal optical component;

the first polarization beam splitter rotator is configured to perform a polarization beam splitting on the first signal optical component incident to one of the two input ports, generating a first polarization component and a second polarization component that are both TE polarization; and to perform the polarization beam splitting of the second signal optical component incident to a second input port, generating a third polarization component and a fourth polarization component, both of which are TM polarized;

the delay interferometer is configured to perform a delayed self-interference of the first polarization component incident to one of the two input ports of the second beam splitter, generating a first interference component and a second interference component to be emitted from the two input ports of the third beam splitter, respectively; and to perform the delayed self-interference of the second polarization component incident to one of the two input ports of the third beam splitter, generating a third interference component and a fourth interference component to be emitted from the two input ports of the second beam splitter, respectively;

the delay interferometer is further configured to perform a delayed self-interference of the third polarization component incident to one of the two input ports of the second beam splitter, generating a fifth interference component and a sixth interference component to be emitted from the two input ports of the third beam splitter, respectively; and to perform the delayed self-interference of the fourth polarization component incident to one of the two input ports of the third beam splitter, generating a seventh interference component and an eighth interference component to be emitted from the two input ports of the second beam splitter, respectively;

a main axis direction of the first quarter-wave plate has an angle of 0° with TE polarization, such that a phase of a TM polarized optical signal is increased by $\pi/2$ and a phase of a TE polarized optical signal remains unchanged when passing through the first quarter-wave plate;

the first delayed optical waveguide is configured to increase the delay of the optical signal passing through by $\tau$;

the first polarization beam splitter rotator is further configured to perform a polarization and beam combination on the first interference component and the third interference component of TE polarization to generate a first interference optical signal; and to perform the polarization and beam combination on the TM polarized fifth interference component and the seventh interference component to generate a third interference optical signal;

the second polarization beam splitter rotator is configured to perform a polarization and beam combination on the second interference component and the fourth interference component of TE polarization to generate a second interference optical signal; and to perform the polarization and beam combination on the TM polarized sixth interference component and the eighth interference component to generate a fourth interference optical signal.

A second polarization independent DQPSK demodulation integrated optical chip of the present application, which comprises the first beam splitter, the first polarization beam splitter rotator, the second beam splitter, the third beam splitter, the first quarter-wave plate, the first delayed optical waveguide, and the second polarization beam splitter rotator that are integrated on a same substrate, the two output ports of the first beam splitter are respectively connected to one of the two input ports of the first polarization beam splitter rotator and one of the two input ports of the second polarization beam splitter rotator through the optical waveguide L3 and the optical waveguide L4; the two output ports of the first polarization beam splitter rotator are respectively connected to one of the two input ports of the second beam splitter and one of the two input ports of the third beam splitter through the optical waveguide; two output ports of the second polarization beam splitter rotator are respectively connected to one of the two input ports of the second beam splitter and one of the two input ports of the third beam splitter through the optical waveguide; the two output ports of the second beam splitter are respectively connected to the two output ports of the third beam splitter through the first quarter-wave plate and the first delayed optical waveguide, and forming the delay interferometer;

the first beam splitter is configured to split an input signal optical to generate the first signal optical component and the second signal optical component;

the first polarization beam splitter rotator is configured to perform the polarization beam splitting of the first signal optical component incident to one of the two input ports of the first polarization beam splitter rotator, generating the first polarization component and the second polarization component that are both TE (Transverse Electric) polarization;

the second polarization beam splitter rotator is configured to perform the polarization beam splitting of the second signal optical component incident to on one of the two input ports of the second polarization beam splitter rotator, generating the third polarization component and the fourth polarization component that are both TM (Transverse Magnetic) polarized;

the delay interferometer is configured to perform the delayed self-interference of the first polarization component incident to one of the two input ports of the second beam splitter, generating the first interference component and the second interference component to be emitted from the two input ports of the third beam splitter, respectively; and to perform the delayed self-interference of the second polarization component incident to one of the two input ports of the third beam splitter, generating the third interference component and the fourth interference component to be emitted from the two input ports of the second beam splitter, respectively;

the delay interferometer is further configured to perform the delayed self-interference of the third polarization component incident to one of the two input ports of the second beam splitter, generating the fifth interference component and the sixth interference component to be emitted from the two input ports of the third beam splitter, respectively; and to perform the delayed self-interference of the fourth polarization component incident to one of the two input ports of the third beam splitter, generating the seventh interference component and the eighth interference component to be emitted from the two input ports of the second beam splitter, respectively;

the main axis direction of the first quarter-wave plate has the angle of 0° with TE polarization, such that a phase of a TM polarized optical signal is increased by $\pi/2$ and a phase of a TE polarized optical signal remains unchanged when passing through the first quarter-wave plate;

the first delayed optical waveguide is configured to increase the delay of the optical signal passing through by $\tau$;

the first polarization beam splitter rotator is further configured to perform the polarization and beam combination on the first interference component and the third interference component of TE polarization to generate the first interference optical signal; and to perform the polarization and beam combination on the TM polarized fifth interference component and the seventh interference component to generate the third interference optical signal;

the second polarization beam splitter rotator is configured to perform the polarization and beam combination on the second interference component and the fourth interference component of TE polarization to generate the second interference optical signal; and to perform the polarization and beam combination on the TM polarized sixth interference component and the eighth interference component to generate the fourth interference optical signal.

A third polarization independent DQPSK demodulation integrated optical chip of the present application, which comprises the first beam splitter, the first polarization beam splitter rotator, the second polarization beam splitter rotator, a third polarization beam splitter rotator, a fourth polarization beam splitter rotator, the first quarter-wave plate, the first delayed optical waveguide, and four 45° polarization rotation structures that are integrated on the same substrate, the two output ports of the first beam splitter are respectively connected to one of the two input ports of the first polarization beam splitter rotator and one of the two input ports of the second polarization beam splitter rotator through the optical waveguide L3 and the optical waveguide L4; the two output ports of the first polarization beam splitter rotator are respectively connected to one of the two input ports of the third polarization beam splitter rotator and one of the two input ports of the fourth polarization beam splitter rotator through the optical waveguide provided with the 45° polarization rotation structure; the two output ports of the second polarization beam splitter rotator are respectively connected to one of the two input ports of the third polarization beam splitter rotator and one of the two input ports of the fourth polarization beam splitter rotator through the optical waveguide provided with the 45° polarization rotation structure; the two output ports of the third polarization beam splitter rotator are respectively connected to the fourth polarization beam splitter rotator through the first quarter-wave plate and the first delayed optical waveguide, and forming the delay polarization interferometer;

the first beam splitter is configured to split an input signal optical to generate the first signal optical component and the second signal optical component;

the first polarization beam splitter rotator is configured to perform the polarization beam splitting of the first signal optical component incident to one of the two input ports of the first polarization beam splitter rotator, generating the first polarization component and the second polarization component that are both TE polarization;

the second polarization beam splitter rotator is configured to perform the polarization beam splitting of the second signal optical component incident to one of the two input ports of the second polarization beam splitter rotator, generating the third polarization component and the fourth polarization component, both of which are TM polarized;

the 45° polarization rotation structure is configured to rotate the polarization of the optical signal by 45°;

the delay polarization interferometer is configured to perform the polarization self-interference with TE polarization in the polarization interferometer, by incident the first polarization component to one of the two input ports of the third polarization beam splitter rotator after the 45° polarization rotation; generating the first interference component to be emitted from one of the two input ports of the fourth polarization beam splitter rotator; and to perform the polarization self-interference with TE polarization in the polarization interferometer, by incident the first polarization component to one of the two input ports of the third polarization beam splitter rotator after the 45° polarization rotation; generating the first interference component to be emitted from one of the two input ports of the fourth polarization beam splitter rotator;

the delay polarization interferometer is configured to perform the polarization self-interference with TM polarization in the polarization interferometer, by incident the first polarization component to one of the two input ports of the third polarization beam splitter rotator after the 45° polarization rotation; generating the first interference component to be emitted from one of the two input ports of the fourth polarization beam splitter rotator; and to perform the polarization self-interference with TM polarization in the polarization interferometer, by incident the first polarization component to one of the two input ports of the third polarization beam splitter rotator after the 45° polarization rotation; generating the first interference component to be emitted from one of the two input ports of the fourth polarization beam splitter rotator;

the main axis direction of the first quarter-wave plate has the angle of 0° with TE polarization, such that a phase of a TM polarized optical signal is increased by $\pi/2$ and a phase of a TE polarized optical signal remains unchanged when passing through the first quarter-wave plate;

the first delayed optical waveguide is configured to increase the delay of the optical signal passing through by $\tau$;

the first polarization beam splitter rotator is further configured to polarize the first polarization interference component after the 45° polarization rotation and the second polarization interference component after the 45° polarization rotation for beam combining, so that the horizontal polarization of the two is simultaneously emitted from one of the two input ports of the first polarization beam splitter rotator, generating the first interference optical signal, and the vertical polarization component of the two is simultaneously emitted from one of the two input ports of the first polarization beam splitter rotator, generating the first interference optical signal;

the second polarization beam splitter rotator is further configured to polarize the third polarization interference component after the 45° polarization rotation and the fourth polarization interference component after the 45° polarization rotation for beam combining, so that the horizontal polarization of the two is simultaneously emitted from one of the two input ports of the second polarization beam splitter rotator, generating the third interference optical signal, and the vertical polarization component of the two is simultaneously emitted from one of the two input ports of the second polarization beam splitter rotator, generating the fourth interference optical signal.

A fourth polarization independent DQPSK demodulation integrated optical chip of the present application, which comprises the first beam splitter, the second beam splitter, the third beam splitter, the first quarter-wave plate, the first delayed optical waveguide, the second polarization beam splitter rotator, the fifth polarization beam splitter rotator, the sixth polarization beam splitter rotator, the seventh polarization beam splitter rotator, and the eighth polarization beam splitter rotator that are integrated on the same substrate, the two output ports of the first beam splitter are respectively connected to one of the two input ports of the fifth polarization beam splitter rotator and one of the two input ports of the seventh polarization beam splitter rotator through the optical waveguide; the two output ports of the fifth polarization beam splitter rotator are respectively connected to one of the two input ports of the sixth polarization beam splitter rotator and one of the two input ports of the eighth polarization beam splitter rotator through the first polarization rotating optical waveguide; the two output ports of the seventh polarization beam splitter rotator are respectively connected to one of the two input ports of the sixth polarization beam splitter rotator and one of the two input ports of the eighth polarization beam splitter rotator through the first polarization rotating optical waveguide; the output ports of the sixth polarization beam splitter rotator and the eighth polarization beam splitter rotator are respectively connected to one of the two input ports of the second beam splitter and one of the two input ports of the third beam splitter through the optical waveguide; the two input ports of the second polarization beam splitter rotator are respectively connected to one of the two input ports of the second beam splitter and one of the two input ports of the third beam splitter through the optical waveguide; the two output ports of the second beam splitter are respectively connected to the two output ports of the third beam splitter through the first quarter-wave plate and the first delayed optical waveguide, and forming the delay interferometer;

the first polarization rotating optical waveguide is composed of the first half wave plate optical waveguide and the first faraday rotatory waveguide, which are closely connected in sequence, the angle between the main axis direction of the first half wave plate optical waveguide and the horizontal direction is 22.5°, and the polarization rotation angle of the first faraday rotatory waveguide is 45°;

the first polarization rotating optical waveguide is configured to rotate the polarization of the optical signal passing in a reverse direction by 90°, and the polarization state of the optical signal passing in a forward direction remains unchanged;

the first beam splitter is configured for splitting the input signal optical to generate the first signal optical component and the second signal optical component;

the fifth polarization beam splitter rotator is configured to perform the polarization beam splitting of the first signal optical component incident to one of the two input ports of the fifth polarization beam splitter rotator, generating the first polarization component and the second polarization component that are both TE polarization; the seventh polarization beam splitter rotator is configured to perform the polarization beam splitting of the second signal optical component incident to one of the two input ports of the seventh polarization beam splitter rotator, generating the third polarization component and the fourth polarization component that are both TE polarized;

the sixth polarization beam splitter rotator is configured to combine the first polarization component and the third polarization component for beam output; the eighth polarization beam splitter rotator is configured to combine the second polarization component and the fourth polarization component for beam output;

the delay interferometer is configured to perform the delayed self-interference of the first polarization component incident to one of the two input ports of the second beam splitter, generating the first interference component and the second interference component to be emitted from the two input ports of the third beam splitter, respectively; and to perform the delayed self-interference of the second polarization component incident to one of the two input ports of the third beam splitter, generating the third interference component and the fourth interference component to be emitted from the two input ports of the second beam splitter, respectively;

the delay interferometer is further configured to perform the delayed self-interference of the third polarization component incident to one of the two input ports of the second beam splitter, generating the fifth interference component and the sixth interference component to be emitted from the two input ports of the third beam splitter, respectively; and to perform the delayed self-interference of the fourth polarization component incident to one of the two input ports of the third beam splitter, generating the seventh interference component and the eighth interference component to be emitted from the two input ports of the second beam splitter, respectively;

the main axis direction of the first quarter-wave plate has the angle of 0° with TE polarization, such that a phase of a TM polarized optical signal is increased by $\pi/2$ and a phase of a TE polarized optical signal remains unchanged when passing through the first quarter-wave plate;

the first delayed optical waveguide is configured to increase the delay of the optical signal passing through by $\tau$;

the sixth polarization beam splitter rotator is further configured for transmitting the third interference component and reflecting the seventh interference component; the eighth polarization beam splitter rotator is further configured for transmitting the first interference component and reflecting the fifth interference component;

the fifth polarization beam splitter rotator is further configured to perform the polarization and beam combination on the third interference component and the first interference component, generating the first interference optical signal emitted from one of the two input ports of the fifth polarization beam splitter rotator; the seventh polarization beam splitter rotator is further configured to perform the polarization and beam combination on the seventh interference component and the fifth interference component, generating the third interference optical signal emitted from one of the two input ports of the seventh polarization beam splitter rotator;

the second polarization beam splitter rotator is configured to perform the polarization and beam combination on the second interference component and the fourth interference component, generating the second interference optical signal emitted from one of the two input ports of the second polarization beam splitter rotator; and to perform the polarization and beam combination on the sixth interference component and the eighth interference component, generating the fourth interference optical signal emitted from one of the two input ports of the second polarization beam splitter rotator;

Compared with the prior art, the present application includes the following beneficial effects:

the present application provides the polarization independent DQPSK demodulation integrated optical chip, which only requires a delay interferometer to measure the in-phase component and the quadrature phase component of the signal optical, reducing a difficulty and complexity of an electronic signal processing after a balanced detection, and thus greatly reducing the complexity of the receiving end. In addition, by allowing the two orthogonal polarization components of the signal optical to pass through the same delay interferometer in opposite directions for self-interference, and polarizing the interference results into beams, polarization independent stable self coherent reception can be achieved, without a need to actively calibrate the polarization of the signal optical using a polarization controller, polarization independent delay self coherence of the signal optical can be achieved, eliminating an impact of a random change in the polarization state of the signal optical on a receiver, improving a stability of the receiving device.

DETAILED DESCRIPTION

The following will provide a clear and complete description of the present application in combination with accompanying drawings in the embodiments of the present application.

Figure 1:
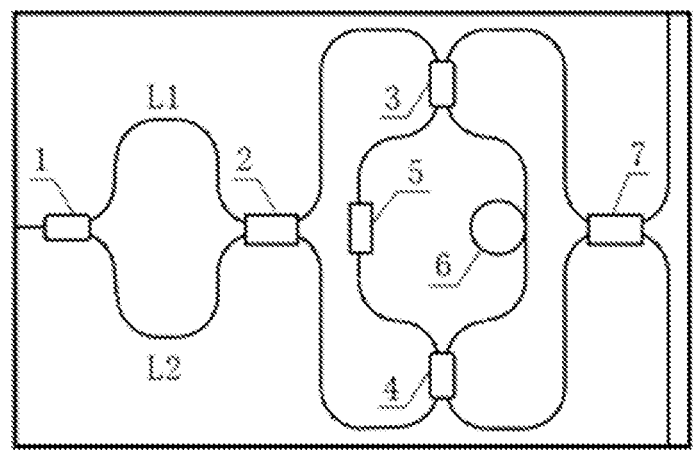
FIG. 1 is a structural principle block view of a first polarization independent DQPSK demodulation integrated optical chip according to the present application.

Referring to FIG. 1, a first polarization independent DQPSK demodulation integrated optical chip according to the present application, includes a first beam splitter 1, a first polarization beam splitter rotator 2, a second beam splitter 3, a third beam splitter 4, a first quarter-wave plate 5, a first delayed optical waveguide 6, and a second polarization beam splitter rotator 7 that are integrated on a same substrate, two output ports of the first beam splitter 1 are respectively connected to the two input ports of the first polarization beam splitter rotator 2 through an optical waveguide L1 and an optical waveguide L2; the two output ports of the first polarization beam splitter rotator 2 are respectively connected to one input port of the second beam splitter 3 and one input port of the third beam splitter 4 through the optical waveguide; two input ports of the second polarization beam splitter rotator 7 are respectively connected to the other input port of the second beam splitter 3 and the other input port of the third beam splitter 4 through the optical waveguide; two output ports of the second beam splitter 3 are respectively connected to two output ports of the third beam splitter 4 through the first quarter-wave plate 5 and the first delayed optical waveguide 6, forming a delay interferometer;

the first beam splitter 1 is configured to split an input signal optical to generate a first signal optical component and a second signal optical component;

the first polarization beam splitter rotator 2 is configured to perform a polarization beam splitting of the first signal optical component incident to one of its input ports, generating a first polarization component and a second polarization component that are both TE polarization; and to perform the polarization beam splitting of the second signal optical component incident to its other input port, generating a third polarization component and a fourth polarization component, both of which are TM polarized;

the delay interferometer is configured to perform a delayed self-interference of the first polarization component incident to one input port of the second beam splitter 3, generating a first interference component and a second interference component to be emitted from the two input ports of the third beam splitter 4, respectively; and to perform the delayed self-interference of the second polarization component incident to one input port of the third beam splitter 4, generating a third interference component and a fourth interference component to be emitted from the two input ports of the second beam splitter 3, respectively;

the delay interferometer is further configured to perform a delayed self-interference of the third polarization component incident to one input port of the second beam splitter 3, generating a fifth interference component and a sixth interference component to be emitted from the two input ports of the third beam splitter 4, respectively; and to perform the delayed self-interference of the fourth polarization component incident to one input port of the third beam splitter 4, generating a seventh interference component and an eighth interference component to be emitted from the two input ports of the second beam splitter 3, respectively;

a main axis direction of the first quarter-wave plate 5 has an angle of 0° with TE polarization, such that a phase of a TM polarized optical signal is increased by $\pi/2$ and a phase of a TE polarized optical signal remains unchanged when passing through the first quarter-wave plate;

the first delayed optical waveguide 6 is configured to increase the delay of the optical signal passing through by $\tau$;

the first polarization beam splitter rotator 2 is further configured to perform a polarization and beam combination on the first interference component and the third interference component of TE polarization to generate a first interference optical signal; and to perform the polarization and beam combination on the fifth interference component and the seventh interference component, both of which are TM polarized, to generate a third interference optical signal;

the second polarization beam splitter rotator 7 is configured to perform a polarization and beam combination on the second interference component and the fourth interference component of TE polarization to generate a second interference optical signal; and to perform the polarization and beam combination on the sixth interference component and the eighth interference component, both of which are TM polarized, to generate a fourth interference optical signal.

The specific working principle is as follows:

the signal optical E(t) received by a receiving device first enters the first beam splitter 1 and is split into the first signal optical component $E_1(t)$ and the second signal optical component $E_2(t)$, meeting the requirement of $E_1(t)=E_2(t)=1/\sqrt{2}E(t)$.

When the first signal optical component $E_1(t)$ passes through the optical waveguide L1 and reaches one input port of the first polarization beam splitter rotator 2, a polarization state is changed to $$E_1(t) = \frac{A(t)e^{j(\omega t+\varphi_0)}}{\sqrt{2}}\begin{bmatrix} \cos\theta_1 \\ \sin\theta_1 e^{j\delta_1} \end{bmatrix}$$

wherein, $\theta_1$ is an angle between a horizontal polarization component and a vertical polarization component of the first signal optical component, $\delta_1$ is a phase difference between the two. Subsequently, it is polarized and split by the first polarization beam splitter rotator 2, generating both the first polarization component $E_{11}(t)$ and the second polarization component $E_{12}(t)$ with TE polarization.

Wherein, $E_{11}(t)$ enters the delay interferometer from one input port of the second beam splitter 3 and performs self-interference at the third beam splitter 4, generating the first interference component and the second interference component, respectively, which are emitted from the two input ports of the third beam splitter 4. The two can be written as $$E_{11out1}(t) = \frac{e^{j(\omega t+\varphi_0)}\cos\theta_1}{2\sqrt{2}}\left[A(t) + A(t-\tau)e^{-j\omega\tau}\right]$$

$$E_{11out2}(t) = \frac{e^{j(\omega t+\varphi_0)}\cos\theta_1}{2\sqrt{2}}\left[A(t) - A(t-\tau)e^{-j\omega\tau}\right]$$

wherein, $\tau$ is the delay corresponding to a difference in arm length between long and short arms of the delay interferometer.

$E_{12}(t)$ enters the delay interferometer from one input port of the third beam splitter 4 in an opposite direction, and performs self-interference at the second beam splitter 3, generating the third interference component and the fourth interference component, they are emitted from the two input ports of the second beam splitter 3, which can be written as $$E_{12out1}(t) = \frac{e^{j(\omega t+\varphi_0)}\sin\theta_1 e^{j\delta_1}}{2\sqrt{2}}\left[A(t) + A(t-\tau)e^{-j\omega\tau}\right]$$

$$E_{12out2}(t) = \frac{e^{j(\omega t+\varphi_0)}\sin\theta_1 e^{j\delta_1}}{2\sqrt{2}}\left[A(t) - A(t-\tau)e^{-j\omega\tau}\right]$$

The first interference component and the third interference component simultaneously enter the first polarization beam splitter rotator 2 to perform a polarization and beam combination, generating the first interference optical signal and entering the optical waveguide L1, and its polarization state can be written as $$E_{out1}(t) = \frac{e^{j(\omega t+\varphi_0)}}{2\sqrt{2}}\left[A(t) + A(t-\tau)e^{-j\omega\tau}\right]\begin{bmatrix} \sin\theta_1 e^{j\delta_1} \\ \cos\theta_1 \end{bmatrix}.$$

The second interference component and the fourth interference component simultaneously enter the second polarization beam splitter rotator 7 to perform the polarization and beam combination, generating the second interference optical signal $$E_{out2}(t) = \frac{e^{j(\omega t + \varphi_0)}}{2\sqrt{2}} \left[ A(t) - A(t-\tau)e^{-j\omega\tau} \right] \begin{bmatrix} \sin\theta_1 e^{j\delta_1} \\ \cos\theta_1 \end{bmatrix}.$$

The second signal optical component $E_2(t)$ enters the other input port of the first polarization beam splitter rotator 2 through the optical waveguide L2, and is polarized and split by it to generate the third polarization component $E_{21}(t)$ and the fourth polarization component $E_{22}(t)$, which are both TM polarized. After the delayed self-interference similar to the first signal optical component, due to the third interference optical signal $E_{out3}(t)$ and the fourth interference optical signal $E_{out4}(t)$ generated by the TM polarized optical signal increase by $\pi/2$ after passing through the phase difference of the first quarter-wave plate 5 can be written as $$E_{out3}(t) = \frac{e^{j(\omega t + \varphi_0)}}{2\sqrt{2}} \left[ A(t) + jA(t-\tau)e^{-j\omega\tau} \right] \begin{bmatrix} \sin\theta_2 e^{j\delta_2} \\ \cos\theta_2 \end{bmatrix}$$

$$E_{out4}(t) = \frac{e^{j(\omega t + \varphi_0)}}{2\sqrt{2}} \left[ A(t) - jA(t-\tau)e^{-j\omega\tau} \right] \begin{bmatrix} \sin\theta_2 e^{j\delta_2} \\ \cos\theta_2 \end{bmatrix}.$$

If a polarization rotation module is not added additionally, the first interference optical signal and the third interference optical signal will respectively correspond and return to the first beam splitter 1 along the optical waveguide L1 and the optical waveguide L2, and cannot be directly detected. An in-phase component and a quadrature phase component of the signal can be obtained by detecting, amplifying, and filtering a DC component of the second interference optical signal and fourth interference optical signal through a photoelectric detector, and can be respectively written as $$I_I(t) = \frac{R}{4} A(t)A(t-\tau)\cos(\omega\tau)$$

$$I_Q(t) = \frac{R}{4} A(t)A(t-\tau)\sin(\omega\tau)$$

wherein, R is a response efficiency of the photoelectric detector, $\omega$ is an angular frequency of the signal optical.

Finally, electrical signals of the in-phase component and the quadrature phase component are combined into a complex signal, which can be written as $$u(t) = I_I(t) - jI_Q(t) = \frac{R}{2}E(t)E^*(t-\tau)$$

by sampling and digital signal processing the above complex signal, electric field information of the signal optical can be recovered and a business data can be obtained.

Figure 2:
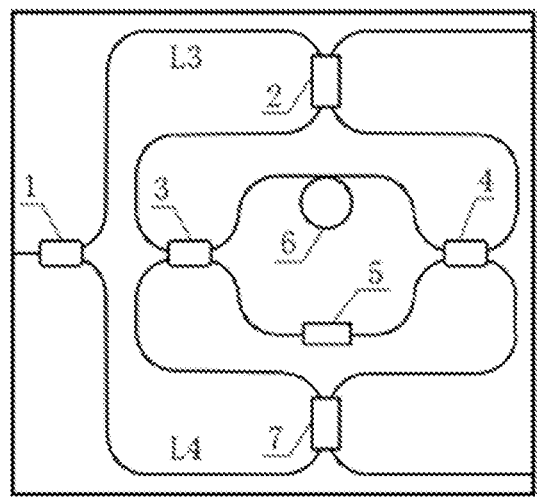
FIG. 2 is a structural principle block view of a second polarization independent DQPSK demodulation integrated optical chip according to the present application.

Referring to FIG. 2, a second polarization independent DQPSK demodulation integrated optical chip according to the present application includes the first beam splitter 1, the first polarization beam splitter rotator 2, the second beam splitter 3, the third beam splitter 4, the first quarter-wave plate 5, the first delayed optical waveguide 6, and the second polarization beam splitter rotator 7 that are integrated on the same substrate, the two output ports of the first beam splitter 1 are respectively connected to one input port of the first polarization beam splitter rotator 2 and one input port of the second polarization beam splitter rotator 7 through an optical waveguide L3 and an optical waveguide L4; the two output ports of the first polarization beam splitter rotator 2 are respectively connected to one input port of the second beam splitter 3 and one input port of the third beam splitter 4 through the optical waveguide; two output ports of the second polarization beam splitter rotator 7 are respectively connected to the other input port of the second beam splitter 3 and the other input port of the third beam splitter 4 through the optical waveguide; the two output ports of the second beam splitter 3 are respectively connected to the two output ports of the third beam splitter 4 through the first quarter-wave plate 5 and the first delayed optical waveguide 6, forming the delay interferometer;

the first beam splitter 1 is configured to split an input signal optical to generate the first signal optical component and the second signal optical component;

the first polarization beam splitter rotator 2 is configured to perform the polarization beam splitting of the first signal optical component incident to one of its input ports, generating the first polarization component and the second polarization component that are both TE polarization;

the second polarization beam splitter rotator 7 is configured to perform the polarization beam splitting of the second signal optical component incident to one of its input ports, generating the third polarization component and the fourth polarization component, both of which are TM polarized;

the delay interferometer is configured to perform the delayed self-interference of the first polarization component incident to one input port of the second beam splitter 3, generating the first interference component and the second interference component to be emitted from the two input ports of the third beam splitter 4, respectively; and to perform the delayed self-interference of the second polarization component incident to one input port of the third beam splitter 4, generating the third interference component and the fourth interference component to be emitted from the two input ports of the second beam splitter 3, respectively;

the delay interferometer is further configured to perform the delayed self-interference of the third polarization component incident to the other input port of the second beam splitter 3, generating the fifth interference component and the sixth interference component to be emitted from the two input ports of the third beam splitter 4, respectively; and to perform the delayed self-interference of the fourth polarization component incident to the other input port of the third beam splitter 4, generating the seventh interference component and the eighth interference component to be emitted from the two input ports of the second beam splitter 3, respectively;

the main axis direction of the first quarter-wave plate 5 has the angle of 0° with TE polarization, such that a phase of a TM polarized optical signal is increased by $\pi/2$ and a phase of a TE polarized optical signal remains unchanged when passing through the first quarter-wave plate;

the first delayed optical waveguide 6 is configured to increase the delay of the optical signal passing through by $\tau$;

the first polarization beam splitter rotator 2 is further configured to perform the polarization and beam combination on the first interference component and the third interference component of TE polarization to generate the first interference optical signal; and to perform the polarization and beam combination on the fifth interference component and the seventh interference component, both of which are TM polarized, to generate the third interference optical signal;

the second polarization beam splitter rotator 7 is configured to perform the polarization and beam combination on the second interference component and the fourth interference component of TE polarization to generate the second interference optical signal; and to perform the polarization and beam combination on the sixth interference component and the eighth interference component, both of which are TM polarized, to generate the fourth interference optical signal.

The specific working principle is as follows:

the signal optical E(t) received by the receiving device first enters the first beam splitter 1 and is split into the first signal optical component $E_1(t)$ and the second signal optical component $E_2(t)$, meeting the requirement of $E_1(t)=E_2(t)=1/\sqrt{2}E(t)$.

When the first signal optical component $E_1(t)$ passes through the optical waveguide L3 and reaches the input port of the first polarization beam splitter rotator 2, the polarization state is changed to $$E_1(t) = \frac{A(t)e^{j(\omega\tau+\varphi_0)}}{\sqrt{2}} \begin{bmatrix} \cos\theta_2 \\ \sin\theta_1 e^{j\delta_1} \end{bmatrix}$$

wherein, $\theta_1$ is the angle between the horizontal polarization component and the vertical polarization component of the first signal optical component, $\delta_1$ is the phase difference between the two. Subsequently, it is polarized and split by the first polarization beam splitter rotator 2, generating both the first polarization component $E_{11}(t)$ and the second polarization component $E_{12}(t)$ with TE polarization.

Wherein, $E_{11}(t)$ enters the delay interferometer from one input port of the second beam splitter 3 and performs self-interference at the third beam splitter 4, generating the first interference component and the second interference component, respectively, which are emitted from the two input ports of the third beam splitter 4, both of which can be written as $$E_{11out1}(t) = \frac{e^{j(\omega t+\varphi_0)}\cos\theta_1}{2\sqrt{2}}[A(t)+A(t-\tau)e^{-j\omega\tau}]$$

$$E_{11out2}(t) = \frac{e^{j(\omega t+\varphi_0)}\cos\theta_1 e^{j\delta_1}}{2\sqrt{2}}[A(t)-A(t-\tau)e^{-j\omega\tau}]$$

wherein, $\tau$ is the delay corresponding to the difference in arm length between the long and short arms of the delay interferometer.

$E_{12}(t)$ enters the delay interferometer from one input port of the third beam splitter 4 in the opposite direction, and performs self-interference at the second beam splitter 3, generating the third interference component and the fourth interference component, they are emitted from the two input ports of the second beam splitter 3, which can be written as $$E_{12out1}(t) = \frac{e^{j(\omega t+\varphi_0)}\sin\theta_1 e^{j\delta_1}}{2\sqrt{2}}[A(t)+A(t-\tau)e^{-j\omega\tau}]$$

$$E_{12out2}(t) = \frac{e^{j(\omega t+\varphi_0)}\sin\theta_1 e^{j\delta_1}}{2\sqrt{2}}[A(t)-A(t-\tau)e^{-j\omega\tau}]$$

The first interference component and the third interference component simultaneously enter the first polarization beam splitter rotator 2 to perform the polarization and beam combination, generating the first interference optical signal and entering the optical waveguide L3, and its polarization state can be written as $$E_{out1}(t) = \frac{e^{j(\omega t+\varphi_0)}}{2\sqrt{2}}[A(t)+A(t-\tau)e^{-j\omega\tau}]\begin{bmatrix}\sin\theta_1 e^{j\delta_1}\\\cos\theta_1\end{bmatrix}.$$

The second interference component and the fourth interference component simultaneously enter the second polarization beam splitter rotator 7 to perform the polarization and beam combination, generating the second interference optical signal that emits from the other input port of the second polarization beam splitter rotator 7, and its polarization state is $$E_{out2}(t) = \frac{e^{j(\omega t+\varphi_0)}}{2\sqrt{2}}[A(t)-A(t-\tau)e^{-j\omega\tau}]\begin{bmatrix}\sin\theta_1 e^{j\delta_1}\\\cos\theta_1\end{bmatrix}.$$

The second signal optical component $E_2(t)$ enters the other input port of the second polarization beam splitter rotator 7 through the optical waveguide L4, and is polarized and split by it to generate the third polarization component $E_{21}(t)$ and the fourth polarization component $E_{22}(t)$, both of which are TM polarized. After the delayed self-interference similar to the first signal optical component, due to the third interference optical signal $E_{out3}(t)$ and the fourth interference optical signal $E_{out4}(t)$ generated by the TM polarized optical signal increase by $\pi/2$ after passing through the phase difference of the first quarter-wave plate 5 can be written as $$E_{out3}(t) = \frac{e^{j(\omega t+\varphi_0)}}{2\sqrt{2}}[A(t)+jA(t-\tau)e^{-j\omega\tau}]\begin{bmatrix}\sin\theta_2 e^{j\delta_2}\\\cos\theta_2\end{bmatrix}$$

$$E_{out4}(t) = \frac{e^{j(\omega t+\varphi_0)}}{2\sqrt{2}}[A(t)-jA(t-\tau)e^{-j\omega\tau}]\begin{bmatrix}\sin\theta_2 e^{j\delta_2}\\\cos\theta_2\end{bmatrix}.$$

If the polarization rotation module is not added additionally, the first interference optical signal and the third interference optical signal will respectively correspond and return to the first beam splitter 1 along the optical waveguide L3 and the optical waveguide L4, and cannot be directly detected. The in-phase component and the quadrature phase component of the signal can be obtained by detecting, amplifying, and filtering the DC component of the second interference optical signal and fourth interference optical signal through the photoelectric detector, and can be respectively written as $$I_I(t) = \frac{R}{4}A(t)A(t-\tau)\cos(\omega\tau)$$

$$I_Q(t) = \frac{R}{4}A(t)A(t-\tau)\sin(\omega\tau)$$

wherein, R is the response efficiency of the photoelectric detector, $\omega$ is the angular frequency of the signal optical.

Finally, electrical signals of the in-phase component and the quadrature phase component are combined into the complex signal, which can be written as $$u(t) = I_I(t) + jI_Q(t) = \frac{R}{2}E(t)E^*(t-\tau)$$

by sampling and digital signal processing the above complex signal, the electric field information of the signal optical can be recovered and the business data can be obtained.

Figure 3:
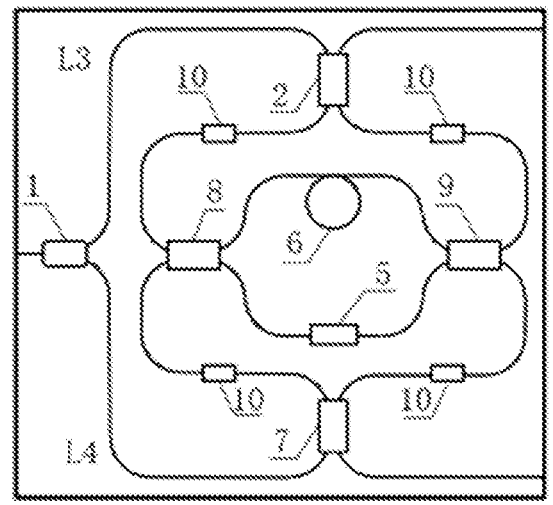
FIG. 3 is a structural principle block view of a third polarization independent DQPSK demodulation integrated optical chip according to the present application.

Referring to FIG. 3, a third polarization independent DQPSK demodulation integrated optical chip according to the present application, includes the first beam splitter 1, the first polarization beam splitter rotator 2, the second polarization beam splitter rotator 7, a third polarization beam splitter rotator 8, a fourth polarization beam splitter rotator 9, the first quarter-wave plate 5, the first delayed optical waveguide 6, and four 45°polarization rotation structures 10 that are integrated on the same substrate, the two output ports of the first beam splitter 1 are respectively connected to one input port of the first polarization beam splitter rotator 2 and one input port of the second polarization beam splitter rotator 7 through an optical waveguide L3 and an optical waveguide L4; the two output ports of the first polarization beam splitter rotator 2 are respectively connected to one input port of the third polarization beam splitter rotator 8 and one input port of the fourth polarization beam splitter rotator 9 through the optical waveguide provided with the 45° polarization rotation structure 10; the two output ports of the second polarization beam splitter rotator 7 are respectively connected to the other input port of the third polarization beam splitter rotator 8 and the other input port of the fourth polarization beam splitter rotator 9 through the optical waveguide provided with the 45° polarization rotation structure 10; the two output ports of the third polarization beam splitter rotator 8 are respectively connected to the fourth polarization beam splitter rotator 9 through the first quarter-wave plate 5 and the first delayed optical waveguide 6, forming a delay polarization interferometer;

the first beam splitter 1 is configured to split an input signal optical to generate the first signal optical component and the second signal optical component;

the first polarization beam splitter rotator 2 is configured to perform the polarization beam splitting of the first signal optical component incident to one of its input ports, generating the first polarization component and the second polarization component that are both TE polarization;

the second polarization beam splitter rotator 7 is configured to perform the polarization beam splitting of the second signal optical component incident to one of its input ports, generating the third polarization component and the fourth polarization component, both of which are TM polarized;

the 45° polarization rotation structure 10 is configured to rotate the polarization of the optical signal by 45°;

the delay polarization interferometer is configured to perform a polarization self-interference with TE polarization in the polarization interferometer, by incident the first polarization component to one input port of the third polarization beam splitter rotator 8 after the 45° polarization rotation; generating the first interference component to be emitted from one input port of the fourth polarization beam splitter rotator 9; and to perform the polarization self-interference with TE polarization in the polarization interferometer, by incident the first polarization component to one input port of the third polarization beam splitter rotator 8 after the 45° polarization rotation; generating the first interference component to be emitted from one input port of the fourth polarization beam splitter rotator 9;

the delay polarization interferometer is configured to perform the polarization self-interference with TM polarization in the polarization interferometer, by incident the first polarization component to the other input port of the third polarization beam splitter rotator 8 after the 45° polarization rotation; generating the first interference component to be emitted from the other input port of the fourth polarization beam splitter rotator 9; and to perform the polarization self-interference with TM polarization in the polarization interferometer, by incident the first polarization component to the other input port of the third polarization beam splitter rotator 8 after the 45° polarization rotation; generating the first interference component to be emitted from the other input port of the fourth polarization beam splitter rotator 9;

the main axis direction of the first quarter-wave plate 5 has the angle of 0° with TE polarization, such that a phase of a TM polarized optical signal is increased by $\pi/2$ and a phase of a TE polarized optical signal remains unchanged when passing through the first quarter-wave plate;

the first delayed optical waveguide 6 is configured to increase the delay of the optical signal passing through by $\tau$;

the first polarization beam splitter rotator 2 is further configured to polarize the first polarization interference component after the 45° polarization rotation and the second polarization interference component after the 45° polarization rotation for beam combining, so that the horizontal polarization of the two is simultaneously emitted from one input port of the first polarization beam splitter rotator 2, generating the first interference optical signal, and the vertical polarization component of the two is simultaneously emitted from the other input port of the first polarization beam splitter rotator 2, generating the second interference optical signal;

the second polarization beam splitter rotator 7 is further configured to polarize the third polarization interference component after the 45° polarization rotation and the fourth polarization interference component after the 45° polarization rotation for beam combining, so that the horizontal polarization of the two is simultaneously emitted from one input port of the second polarization beam splitter rotator 7, generating the third interference optical signal, and the vertical polarization component of the two is simultaneously emitted from the other input port of the second polarization beam splitter rotator 7, generating the fourth interference optical signal.

The specific working principle is as follows:

the signal optical E(t) received by the receiving device first enters the first beam splitter 1 and is split into the first signal optical component $E_1(t)$ and the second signal optical component $E_2(t)$, meeting the requirement of $E_1(t)=E_2(t)=1/\sqrt{2}E(t)$.

When the first signal optical component $E_1(t)$ passes through the optical waveguide L3 and reaches the input port of the first polarization beam splitter rotator 2, the polarization state is changed to $$E_1(t) = \frac{A(t)e^{j(\omega t + \varphi_0)}}{\sqrt{2}} \begin{bmatrix} \cos\theta_1 \\ \sin\theta_1 e^{j\delta_1} \end{bmatrix}$$

wherein, $\theta_1$ is the angle between the horizontal polarization component and the vertical polarization component of the first signal optical component, $\delta_1$ is the phase difference between the two. Subsequently, it is polarized and split by the first polarization beam splitter rotator 2, generating both the first polarization component $E_{11}(t)$ and the second polarization component $E_{12}(t)$ with TE polarization.

Wherein, after the 45° polarization rotation structure 10 the polarization state of $E_{11}(t)$ is changed to $$E_{11}(t) = \frac{A(t)e^{j(\omega t + \varphi_0)}}{2}\begin{bmatrix} \cos\theta_1 \\ \cos\theta_1 \end{bmatrix},$$

subsequently, the third polarization beam splitter rotator 8 performs the polarization beam splitting, generating two components with both TE polarization that enter the long and short arms of the polarization interferometer respectively, wherein the phase of the component propagating along the short arm unchanged when passing through the first quarter-wave plate 5, and the phase difference of the components propagating along the long and short arms is 0, both of them perform the polarization self-interference at the fourth polarization beam splitter rotator 9, generating the first polarization interference component, and its polarization state is $$E_{11out}(t) = \frac{e^{j(\omega t + \varphi_0)}\cos\theta_1}{2}\begin{bmatrix} A(t) \\ A(t-\tau)e^{-j\omega\tau} \end{bmatrix}$$

wherein, $\tau$ is the delay corresponding to the difference in arm length between the long and short arms of the delay interferometer.

After the 45° polarization rotation structure 10, the polarization self-interference is changed to $$E_{11out}(t) = \frac{e^{j(\omega t + \varphi_0)}\cos\theta_1}{2\sqrt{2}}\begin{bmatrix} A(t) + A(t-\tau)e^{-j\omega\tau} \\ A(t) - A(t-\tau)e^{-j\omega\tau} \end{bmatrix},$$

after the 45° polarization rotation structure 10, the polarization state of $E_{12}(t)$ is changed to $$E_{12}(t) = \frac{A(t)e^{j(\omega t + \varphi_0)}}{2}\begin{bmatrix} \sin\theta_1 e^{j\delta_1} \\ \sin\theta_1 e^{j\delta_1} \end{bmatrix},$$

subsequently, the fourth polarization beam splitter 9 performs the polarization beam splitting, generating two components with both TE polarization that enter the long and short arms of the polarization interferometer respectively, wherein the phase of the component propagating along the short arm remains unchanged when passing through the first quarter-wave plate 5, and the phase difference of the components propagating along the long and short arms is 0, both of them perform the polarization self-interference at the third polarization beam splitter rotator 8, generating the second polarization interference component, and its polarization state is $$E_{12out}(t) = \frac{e^{j(\omega t + \varphi_0)}\sin\theta_1 e^{j\delta_1}}{2}\begin{bmatrix} A(t) \\ A(t-\tau)e^{-j\omega\tau} \end{bmatrix},$$

after the 45° polarization rotation structure 10 it is changed to $$E_{12out}(t) = \frac{e^{j(\omega t + \varphi_0)}\sin\theta_1 e^{j\delta_1}}{2\sqrt{2}}\begin{bmatrix} A(t) + A(t-\tau)e^{-j\omega\tau} \\ A(t) - A(t-\tau)e^{-j\omega\tau} \end{bmatrix},$$

the first polarization interference component $E_{11out}(t)$ and the second polarization interference component $E_{12out}(t)$ simultaneously enter the first polarization beam splitter rotator 2 to perform the polarization and beam combination, so that the horizontal polarization of the two is simultaneously emitted from one input port of the first polarization beam splitter rotator 2, generating the first interference optical signal, and the vertical polarization component of the two is simultaneously emitted from the other input port of the first polarization beam splitter rotator 2, the polarization state of the first interference optical signal and the second interference optical signal can be written as $$E_{out1}(t) = \frac{e^{j(\omega t + \varphi_0)}}{2\sqrt{2}}[A(t) + A(t-\tau)e^{-j\omega\tau}]\begin{bmatrix} \sin\theta_1 e^{j\delta_1} \\ \cos\theta_1 \end{bmatrix}$$

$$E_{out2}(t) = \frac{e^{j(\omega t + \varphi_0)}}{2\sqrt{2}}[A(t) - A(t-\tau)e^{-j\omega\tau}]\begin{bmatrix} \sin\theta_1 e^{j\delta_1} \\ \cos\theta_1 \end{bmatrix}.$$

The second signal optical component $E_2(t)$ enters one input port of the second polarization beam splitter rotator 7 through the optical waveguide L4, and is polarized and split by it to generate the third polarization component $E_{21}(t)$ and the fourth polarization component $E_{22}(t)$, which are both TM polarized. After the delayed self-interference similar to the first signal optical component, the third interference optical signal $E_{out3}(t)$ and the fourth interference optical signal $E_{out4}(t)$ generated by the TM polarized optical signal correspond to emitted from one input port of the second polarization beam splitter rotator 7 and the other input port of the first polarization beam splitter 2, increase by $\pi/2$ after passing through the phase difference of the first quarter-wave plate 5, respectively, the two can be written as $$E_{out3}(t) = \frac{e^{j(\omega t + \varphi_0)}}{2\sqrt{2}}[A(t) + jA(t-\tau)e^{-j\omega\tau}]\begin{bmatrix} \sin\theta_2 e^{j\delta_2} \\ \cos\theta_2 \end{bmatrix}$$

$$E_{out4}(t) = \frac{e^{j(\omega t + \varphi_0)}}{2\sqrt{2}}[A(t) - jA(t-\tau)e^{-j\omega\tau}]\begin{bmatrix} \sin\theta_2 e^{j\delta_2} \\ \cos\theta_2 \end{bmatrix}.$$

If the polarization rotation module is not added additionally, the first interference optical signal and the third interference optical signal will respectively correspond and return to the first beam splitter 1 along the optical waveguide L3 and the optical waveguide L4, and cannot be directly detected. An in-phase component and a quadrature phase component of the signal can be obtained by detecting, amplifying, and filtering a DC component of the second interference optical signal and fourth interference optical signal through a photoelectric detector, and can be respectively written as $$I_I(t) = \frac{R}{4}A(t)A(t-\tau)\cos(\omega\tau)$$

$$I_Q(t) = \frac{R}{4}A(t)A(t-\tau)\sin(\omega\tau)$$

wherein, R is the response efficiency of the photoelectric detector, ω is the angular frequency of the signal optical.

Finally, electrical signals of the in-phase component and the quadrature phase component are combined into the complex signal, which can be written as $$u(t) = I_I(t) + jI_Q(t) = \frac{R}{2}E(t)E^*(t-\tau)$$

by sampling and digital signal processing the above complex signal, the electric field information of the signal optical can be recovered and the business data can be obtained.

Figure 4:
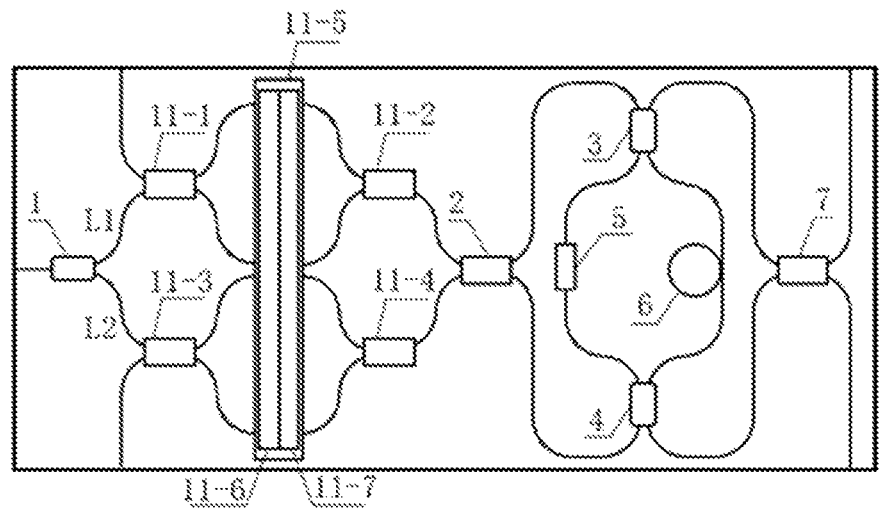
FIG. 4 is a structural principle block view of embodiment 1 of the polarization independent DQPSK demodulation integrated optical chip according to the present application.

Referring to FIG. 4, an embodiment 1 of the polarization independent DQPSK demodulation integrated optical chip according to the present application:

the polarization independent DQPSK demodulation integrated optical chip, includes the first beam splitter 1, the first polarization beam splitter rotator 2, the second beam splitter 3, the third beam splitter 4, the first quarter-wave plate 5, the first delayed optical waveguide 6, and the second polarization beam splitter rotator 7 that are integrated on the same substrate, the two output ports of the first beam splitter 1 are respectively connected to the two input ports of the first polarization beam splitter rotator 2 through the optical waveguide L1 and the optical waveguide L2; the two output ports of the first polarization beam splitter rotator 2 are respectively connected to one input port of the second beam splitter 3 and one input port of the third beam splitter 4 through the optical waveguide; the two output ports of the second polarization beam splitter rotator 7 are respectively connected to the other input port of the second beam splitter 3 and the other input port of the third beam splitter 4 through the optical waveguide; the two output ports of the second beam splitter 3 are respectively connected to the two output ports of the third beam splitter 4 through the first quarter-wave plate 5 and the first delayed optical waveguide 6, forming the delay interferometer;

the first beam splitter 1 is configured to split an input signal optical to generate the first signal optical component and the second signal optical component;

the first polarization beam splitter rotator 2 is configured to perform the polarization beam splitting of the first signal optical component incident to one of its input ports, generating the first polarization component and the second polarization component that are both TM polarization; and to perform the polarization beam splitting of the second signal optical component incident to the other input port of it, generating the third polarization component and the fourth polarization component, both of which are TM polarized;

the delay interferometer is configured to perform the delayed self-interference of the first polarization component incident to one input port of the second beam splitter 3, generating the first interference component and the second interference component to be emitted from the two input ports of the third beam splitter 4, respectively; and to perform the delayed self-interference of the second polarization component incident to one input port of the third beam splitter 4, generating the third interference component and the fourth interference component to be emitted from the two input ports of the second beam splitter 3, respectively;

the delay interferometer is further configured to perform the delayed self-interference of the third polarization component incident to one input port of the second beam splitter 3, generating the fifth interference component and the sixth interference component to be emitted from the two input ports of the third beam splitter 4, respectively; and to perform the delayed self-interference of the fourth polarization component incident to one input port of the third beam splitter 4, generating the seventh interference component and the eighth interference component to be emitted from the two input ports of the second beam splitter 3, respectively;

the main axis direction of the first quarter-wave plate 5 has the angle of 0° with TE polarization, such that a phase of a TM polarized optical signal is increased by π/2 and a phase of a TE polarized optical signal remains unchanged when passing through the first quarter-wave plate;

the first delayed optical waveguide 6 is configured to increase the delay of the optical signal passing through by τ;

the first polarization beam splitter rotator 2 is further configured to perform the polarization and beam combination on the first interference component and the third interference component of TE polarization to generate the first interference optical signal; and to perform the polarization and beam combination on the fifth interference component and the seventh interference component, both of which are TM polarized, to generate the third interference optical signal;

the second polarization beam splitter rotator 7 is configured to perform the polarization and beam combination on the second interference component and the fourth interference component of TE polarization to generate the second interference optical signal; and to perform the polarization and beam combination on the sixth interference component and the eighth interference component, both of which are TM polarized, to generate the fourth interference optical signal.

The optical waveguide L1 is provided with a fifth polarization beam splitter rotator 11-1 and a sixth polarization beam splitter rotator 11-2, the optical waveguide L2 is provided with a seventh polarization beam splitter rotator 11-3 and an eighth polarization beam splitter rotator 11-4, the two output ports of the fifth polarization beam splitter rotator 11-1 are respectively connected to the two input ports of the sixth polarization beam splitter rotator 11-2 through the optical waveguide, forming a first equal arm interferometer; the two output ports of the seventh polarization beam splitter rotator 11-3 are respectively connected to the two input ports of the eighth polarization beam splitter rotator 11-4 through the optical waveguide, forming a second equal arm interferometer;

the optical waveguides of four arms of the first and second equal arm interferometers are vertically provided with notch grooves 11-5;

the notch grooves 11-5 are inserted with aligned and tightly fitting half wave plates 11-6 and faraday rotatory plates 11-7, angles between main axes of the half wave plates 11-6 and horizontal directions are 22.5°, and polarization rotation angles of the faraday rotatory plates 11-7 are 45°;

the half wave plate 11-6 and the faraday rotatory plate 11-7 are configured to rotate the polarization of the optical signal passing in a reverse direction by 90°, and the polarization state of the optical signal passing in a forward direction remains unchanged;

the first equal arm interferometer is configured to cause the first signal optical component incident from one input port of the fifth polarization beam splitter rotator 11-1 to emit from the output port of the sixth polarization beam splitter rotator 11-2, and to cause the first interference optical signal incident from the output port of the sixth polarization beam splitter rotator 11-2 to emit from the other output port of the fifth polarization beam splitter rotator 11-1;

the second equal arm interferometer is configured to cause the second signal optical component incident from one input port of the seventh polarization beam splitter rotator 11-3 to emit from the output port of the eighth polarization beam splitter rotator 11-4, and to cause the third interference optical signal incident from the output port of the eighth polarization beam splitter rotator 11-4 to emit from the other output port of the seventh polarization beam splitter rotator 11-3.

The specific working principle of the embodiment 1 is as follows:

the signal optical E(t) received by the receiving device first enters the first beam splitter 1 and is split into the first signal optical component $E_1(t)$ and the second signal optical component $E_2(t)$, meeting the requirement of $E_1(t)=E_2(t)=1/\sqrt{2}E(t)$.

The first signal optical component $E_1(t)$ passes through the optical waveguide L1 and reaches the fifth polarization beam splitter rotator 11-1, which is polarized and split, generating the first polarization component of the first signal optical and the second polarization component of the first signal optical, both of which are TE polarized, after passing through the half wave plate 11-6 and the faraday rotatory plate 11-7 respectively, the polarization state remains unchanged, and is polarized and beam combined by the sixth polarization beam splitter rotator 11-2, which is then recombined into the first signal optical component, when it reaches one input port of the first polarization beam splitter rotator 2, the polarization state is changed to $$E_1(t) = \frac{A(t)e^{j(\omega t+\varphi_0)}}{\sqrt{2}}\begin{bmatrix} \cos\theta_1 \\ \sin\theta_1 e^{j\delta_1} \end{bmatrix},$$

wherein, $\theta_1$ is the angle between the horizontal polarization component and the vertical polarization component of the first signal optical component, $\delta_1$ is the phase difference between the two. Subsequently, it is polarized and split by the first polarization beam splitter rotator 2, generating both the first polarization component $E_{11}(t)$ and the second polarization component $E_{12}(t)$ with TE polarization.

$E_{11}(t)$ enters the delay interferometer from one input port of the second beam splitter 3 and performs self-interference at the third beam splitter 4, generating the first interference component and the second interference component, which are emitted from the two input ports of the third beam splitter 4 respectively, both of which can be written as $$E_{11out1}(t) = \frac{e^{j(\omega t+\varphi_0)}\cos\theta_1}{2\sqrt{2}}\left[A(t) + A(t-\tau)e^{-j\omega\tau}\right]$$

$$E_{11out2}(t) = \frac{e^{j(\omega t+\varphi_0)}\cos\theta_1}{2\sqrt{2}}\left[A(t) - A(t-\tau)e^{-j\omega\tau}\right].$$

wherein, $\tau$ is the delay corresponding to the difference in arm length between the long and short arms of the delay interferometer.

$E_{12}(t)$ enters the delay interferometer from one input port of the third beam splitter 4 in the opposite direction, and performs self-interference at the second beam splitter 3, generating the third interference component and the fourth interference component, they are emitted from the two input ports of the second beam splitter 3, which can be written as $$E_{12out1}(t) = \frac{e^{j(\omega t+\varphi_0)}\sin\theta_1 e^{j\delta_1}}{2\sqrt{2}}\left[A(t) + A(t-\tau)e^{-j\omega\tau}\right]$$

$$E_{12out2}(t) = \frac{e^{j(\omega t+\varphi_0)}\sin\theta_1 e^{j\delta_1}}{2\sqrt{2}}\left[A(t) - A(t-\tau)e^{-j\omega\tau}\right].$$

The first interference component and the third interference component simultaneously enter the first polarization beam splitter rotator 2 to perform the polarization and beam combination, generating the first interference optical signal, which is emitted from the port where the first signal optical component is incident, and then reaches the output port of the sixth polarization beam splitter rotator 11-2, that are polarized and split into two polarization components, both of which are TE polarization, after passing through the faraday rotatory plate 11-7 and half wave plate 11-6 respectively, the polarization state rotates by 90° and is changed to TM polarization, after being beam combined by the fifth polarization beam splitter 11-1 and emitted from its other input port, the polarization state of the first interference optical signal that finally output can be written as $$E_{out1}(t) = \frac{e^{j(\omega t+\varphi_0)}}{2\sqrt{2}}\left[A(t) + A(t-\tau)e^{-j\omega\tau}\right]\begin{bmatrix} \sin\theta_1 e^{j\delta_1} \\ \cos\theta_1 \end{bmatrix}.$$

The second interference component and the fourth interference component simultaneously enter the second polarization beam splitter rotator 7 to perform the polarization and beam combination, generating the second interference optical signal that emits from one of its output ports, the polarization state of the second interference optical signal is $$E_{out2}(t) = \frac{e^{j(\omega t+\varphi_0)}}{2\sqrt{2}}\left[A(t) - A(t-\tau)e^{-j\omega\tau}\right]\begin{bmatrix} \sin\theta_1 e^{j\delta_1} \\ \cos\theta_1 \end{bmatrix}.$$

The second signal optical component $E_2(t)$ enters one input port of the seventh polarization beam splitter rotator 11-3 through the optical waveguide L2, and is polarized and split into two polarization components, both of which are TE polarized, after passing through the half wave plate 11-6 and the faraday rotatory plate 11-7 respectively, the polarization state remains unchanged, and is polarized and beam combined by the eighth polarization beam splitter rotator 11-4, which is then recombined into the first signal optical component, when it reaches the other input port of the first polarization beam splitter rotator 2, the polarization state is changed to $$E_2(t) = \frac{A(t)e^{j(\omega t+\varphi_0)}}{\sqrt{2}}\begin{bmatrix} \cos\theta_2 \\ \sin\theta_2 e^{j\delta_2} \end{bmatrix},$$

subsequently, $E_2(t)$ is polarized by the first polarization beam splitter rotator 2 to generate two polarization components, both of which are TM polarized, after the delayed self-interference similar to the first signal optical component, due to the third interference optical signal $E_{out3}(t)$ and the fourth interference optical signal $E_{out4}(t)$ generated by the TM polarized optical signal increase by π/2 after passing through the phase difference of the first quarter-wave plate 5.

Wherein the third interference optical signal is emitted from the other input port of the first polarization beam splitter rotator 2 and enters the output port of the eighth polarization beam splitter rotator 11-4, that is polarized and split into two polarization components, both of which are TE polarization, after passing through the faraday rotatory plate 11-7 and the half wave plate 11-6 respectively, the polarization state of the two rotates by 90° and is changed to TM polarization, after being beam combined by the seventh polarization beam splitter 11-3 and emitted from its other input port, the polarization state of the first interference optical signal that finally output can be written as $$E_{out3}(t) = \frac{e^{j(\omega t + \varphi_0)}}{2\sqrt{2}}[A(t) + jA(t-\tau)e^{-j\omega\tau}]\begin{bmatrix}\sin\theta_2 e^{j\delta_2}\\ \cos\theta_2\end{bmatrix}.$$

The fourth interference optical signal is emitted from the other output port of the second polarization beam splitter rotator 7, the polarization state is $$E_{out4}(t) = \frac{e^{j(\omega t + \varphi_0)}}{2\sqrt{2}}[A(t) - jA(t-\tau)e^{-j\omega\tau}]\begin{bmatrix}\sin\theta_2 e^{j\delta_2}\\ \cos\theta_2\end{bmatrix}.$$

By balancing and detecting differential current signals generated by the first interference optical signal, the second interference optical signal, the third interference optical signal, and the fourth interference optical signal, the in-phase component and the quadrature phase component of the signal can be obtained, which can be respectively written as $$I_I(t) = R[|E_{out1}(t)|^2 - |E_{out2}(t)|^2] = \frac{R}{2}|E(t)||E(t-\tau)|\cos(\omega\tau)$$

$$= \frac{R}{2}A(t)A(t-\tau)\cos(\omega\tau)$$

$$I_Q(t) = R[|E_{out3}(t)|^2 - |E_{out4}(t)|^2] = \frac{R}{2}|E(t)||E(t-\tau)|\sin(\omega\tau)$$

$$= \frac{R}{2}A(t)A(t-\tau)\sin(\omega\tau)$$

wherein, R is the response efficiency of the photoelectric detector, ω is the angular frequency of the signal optical.

Finally, electrical signals of the in-phase component and the quadrature phase component are combined into the complex signal, which can be written as $$u(t) = I_I(t) + jI_Q(t) = \frac{R}{2}E(t)E^*(t-\tau)$$

by sampling and digital signal processing the above complex signal, the electric field information of the signal optical can be recovered and the business data can be obtained.

Figure 5:
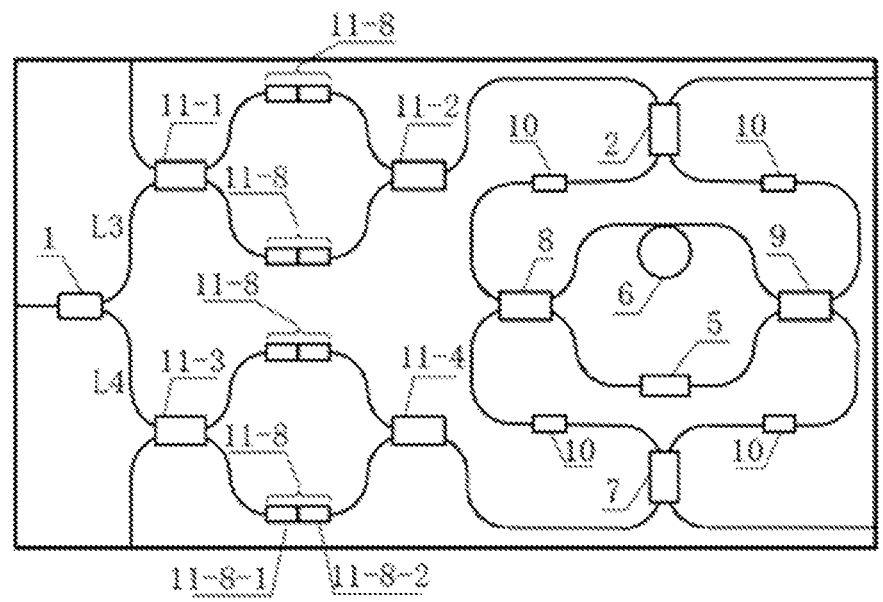
FIG. 5 is a structural principle block view of embodiment 2 of the polarization independent DQPSK demodulation integrated optical chip according to the present application.

Referring to FIG. 5, an embodiment 2 of the polarization independent DQPSK demodulation integrated optical chip according to the present application:

the polarization independent DQPSK demodulation integrated optical chip, includes the first beam splitter 1, the first polarization beam splitter rotator 2, the second polarization beam splitter rotator 7, the third polarization beam splitter rotator 8, the fourth polarization beam splitter rotator 9, the first quarter-wave plate 5, the first delayed optical waveguide 6, and four 45° polarization rotation structures 10 that are integrated on the same substrate, the two output ports of the first beam splitter 1 are respectively connected to one input port of the first polarization beam splitter rotator 2 and one input port of the second polarization beam splitter rotator 7 through the optical waveguide L3 and the optical waveguide L4; the two output ports of the first polarization beam splitter rotator 2 are respectively connected to one input port of the third polarization beam splitter rotator 8 and one input port of the fourth polarization beam splitter rotator 9 through the optical waveguide provided with the 45° polarization rotation structure 10; the two output ports of the second polarization beam splitter rotator 7 are respectively connected to the other input port of the third polarization beam splitter rotator 8 and the other input port of the fourth polarization beam splitter rotator 9 through the optical waveguide provided with the 45° polarization rotation structure 10; the two output ports of the third polarization beam splitter rotator 8 are respectively connected to the fourth polarization beam splitter rotator 9 through the first quarter-wave plate 5 and the first delayed optical waveguide 6, forming the delay polarization interferometer;

the first beam splitter 1 is configured to split an input signal optical to generate the first signal optical component and the second signal optical component;

the first polarization beam splitter rotator 2 is configured to perform the polarization beam splitting of the first signal optical component incident to one of its input ports, generating the first polarization component and the second polarization component that are both TE polarization;

the second polarization beam splitter rotator 7 is configured to perform the polarization beam splitting of the second signal optical component incident to one of its input ports, generating the third polarization component and the fourth polarization component, both of which are TM polarized;

the 45° polarization rotation structure 10 is configured to rotate the polarization of the optical signal by 45°;

the delay polarization interferometer is configured to perform the polarization self-interference with TE polarization in the polarization interferometer, by incident the first polarization component to one input port of the third polarization beam splitter rotator 8 after the 45° polarization rotation; generating the first interference component to be emitted from one input port of the fourth polarization beam splitter rotator 9; and to perform the polarization self-interference with TE polarization in the polarization interferometer, by incident the first polarization component to one input port of the third polarization beam splitter rotator 8 after the 45° polarization rotation; generating the first interference component to be emitted from one input port of the fourth polarization beam splitter rotator 9;

the delay polarization interferometer is configured to perform the polarization self-interference with TM polarization in the polarization interferometer, by incident the first polarization component to the other input port of the third polarization beam splitter rotator 8 after the 45° polarization rotation; generating the first interference component to be emitted from the other input port of the fourth polarization beam splitter rotator 9; and to perform the polarization self-interference with TM polarization in the polarization interferometer, by incident the first polarization component to the other input port of the third polarization beam splitter rotator 8 after the 45° polarization rotation; generating the first interference component to be emitted from the other input port of the fourth polarization beam splitter rotator 9;

the main axis direction of the first quarter-wave plate 5 has the angle of 0° with TE polarization, such that a phase of a TM polarized optical signal is increased by π/2 and a phase of a TE polarized optical signal remains unchanged when passing through the first quarter-wave plate;

the first delayed optical waveguide 6 is configured to increase the delay of the optical signal passing through by τ;

the first polarization beam splitter rotator 2 is further configured to polarize the first polarization interference component after the 45° polarization rotation and the second polarization interference component after the 45° polarization rotation for beam combining, so that the horizontal polarization of the two is simultaneously emitted from one input port of the first polarization beam splitter rotator 2, generating the first interference optical signal, and the vertical polarization component of the two is simultaneously emitted from the other input port of the first polarization beam splitter rotator 2, generating the second interference optical signal;

the second polarization beam splitter rotator 7 is further configured to polarize the third polarization interference component after the 45° polarization rotation and the fourth polarization interference component after the 45° polarization rotation for beam combining, so that the horizontal polarization of the two is simultaneously emitted from one input port of the second polarization beam splitter rotator 7, generating the third interference optical signal, and the vertical polarization component of the two is simultaneously emitted from the other input port of the second polarization beam splitter rotator 7, generating the fourth interference optical signal.

The optical waveguide L3 is provided with the fifth polarization beam splitter rotator 11-1 and the sixth polarization beam splitter rotator 11-2, the optical waveguide L4 is provided with the seventh polarization beam splitter rotator 11-3 and the eighth polarization beam splitter rotator 11-4, the two output ports of the fifth polarization beam splitter rotator 11-1 are respectively connected to the two input ports of the sixth polarization beam splitter rotator 11-2 through the optical waveguide, forming the first equal arm interferometer; the two output ports of the seventh polarization beam splitter rotator 11-3 are respectively connected to the two input ports of the eighth polarization beam splitter rotator 11-4 through the optical waveguide, forming the second equal arm interferometer;

the optical waveguides of four arms of the first and second equal arm interferometers are both provided with a first polarization rotating optical waveguide 11-8;

the first polarization rotating optical waveguide 11-8 is composed of a first half wave plate optical waveguide 11-8-1 and a first faraday rotatory waveguide 11-8-2, which are closely connected in sequence, an angle between a main axis direction of the first half wave plate optical waveguide 11-8-1 and the horizontal direction is 22.5°, and a polarization rotation angle of the first faraday rotatory waveguide 11-8-2 is 45°;

the first polarization rotating optical waveguide 11-8 is configured to rotate the polarization of the optical signal passing in a reverse direction by 90°, and the polarization state of the optical signal passing in a forward direction remains unchanged;

the first equal arm interferometer is configured to cause the first signal optical component incident from one input port of the fifth polarization beam splitter rotator 11-1 to emit from the output port of the sixth polarization beam splitter rotator 11-2, and to cause the first interference optical signal incident from the output port of the sixth polarization beam splitter rotator 11-2 to emit from the other output port of the fifth polarization beam splitter rotator 11-1;

the second equal arm interferometer is configured to cause the second signal optical component incident from one input port of the seventh polarization beam splitter rotator 11-3 to emit from the output port of the eighth polarization beam splitter rotator 11-4, and to cause the third interference optical signal incident from the output port of the eighth polarization beam splitter rotator 11-4 to emit from the other output port of the seventh polarization beam splitter rotator 11-3.

The specific working principle of the embodiment 2 is as follows:

the signal optical E(t) received by the receiving device first enters the first beam splitter 1 and is split into the first signal optical component $E_1(t)$ and the second signal optical component $E_2(t)$, meeting the requirement of $E_1(t)=E_2(t)=1/\sqrt{2}E(t)$.

The first signal optical component $E_1(t)$ passes through the optical waveguide L1 and reaches the fifth polarization beam splitter rotator 11-1, which is polarized and split, generating the first polarization component of the first signal optical and the second polarization component of the first signal optical, both of which are TE polarized, after passing through the first polarization rotating optical waveguide 11-8 respectively, the polarization state remains unchanged, and is polarized and beam combined by the sixth polarization beam splitter rotator 11-2, which is then recombined into the first signal optical component, when it reaches one input port of the first polarization beam splitter rotator 2, the polarization state is changed to $$E_1(t) = \frac{A(t)e^{j(\omega t+\varphi_0)}}{\sqrt{2}}\begin{bmatrix} \cos\theta_1 \\ \sin\theta_1 e^{j\delta_1} \end{bmatrix},$$

wherein, $\theta_1$ is the angle between the horizontal polarization component and the vertical polarization component of the first signal optical component, $\delta_1$ is the phase difference between the two. Subsequently, it is polarized and split by the first polarization beam splitter rotator 2, generating both the first polarization component $E_{11}(t)$ and the second polarization component $E_{12}(t)$ with TE polarization.

Wherein, after the 45° polarization rotation structure 10 the polarization state of $E_{11}(t)$ is changed to $$E_{11}(t) = \frac{A(t)e^{j(\omega t+\varphi_0)}}{\sqrt{2}}\begin{bmatrix} \cos\theta_1 \\ \cos\theta_1 \end{bmatrix},$$

subsequently, the third polarization beam splitter rotator 8 performs the polarization beam splitting, generating two components with both TE polarization that enter the long and short arms of the polarization interferometer respectively, wherein the phase of the component propagating along the short arm unchanged when passing through the first quarter-wave plate 5, and the phase difference of the components propagating along the long and short arms is 0, both of them perform the polarization self-interference at the fourth polarization beam splitter rotator 9, generating the first polarization interference component, and its polarization state is $$E_{11out}(t) = \frac{e^{j(\omega t+\varphi_0)}\cos\theta_1}{2}\begin{bmatrix} A(t) \\ A(t-\tau)e^{-j\omega\tau} \end{bmatrix},$$

wherein, τ is the delay corresponding to the difference in arm length between the long and short arms of the delay interferometer.

After the 45° polarization rotation structure 10 the polarization self-interference is changed to $$E_{11out}(t) = \frac{e^{j(\omega t+\varphi_0)}\cos\theta_1}{2\sqrt{2}}\begin{bmatrix} A(t)+A(t-\tau)e^{-j\omega\tau} \\ A(t)-A(t-\tau)e^{-j\omega\tau} \end{bmatrix},$$

after the 45° polarization rotation structure 10 the polarization state of $E_{12}(t)$ is changed to $$E_{12}(t) = \frac{A(t)e^{j(\omega t+\varphi_0)}}{2}\begin{bmatrix} \sin\theta_1 e^{j\delta_1} \\ \sin\theta_1 e^{j\delta_1} \end{bmatrix},$$

subsequently, the third polarization beam splitter rotator 8 performs the polarization beam splitting, generating two components with both TE polarization that enter the long and short arms of the polarization interferometer respectively, wherein the phase of the component propagating along the short arm remains unchanged when passing through the first quarter-wave plate 5, and the phase difference of the components propagating along the long and short arms is 0, both of them perform the polarization self-interference at the fourth polarization beam splitter rotator 9, generating the second polarization interference component, and its polarization state is $$E_{12out}(t) = \frac{e^{j(\omega t+\varphi_0)}\sin\theta_1 e^{j\delta_1}}{2}\begin{bmatrix} A(t) \\ A(t-\tau)e^{-j\omega\tau} \end{bmatrix},$$

after the 45° polarization rotation structure 10 it is changed to $$E_{12out}(t) = \frac{e^{j(\omega t+\varphi_0)}\sin\theta_1 e^{j\delta_1}}{2\sqrt{2}}\begin{bmatrix} A(t)+A(t-\tau)e^{-j\omega\tau} \\ A(t)-A(t-\tau)e^{-j\omega\tau} \end{bmatrix},$$

The first polarization interference component $E_{11out}(t)$ and the second polarization interference component $E_{12out}(t)$ simultaneously enter the first polarization beam splitter rotator 2 to perform the polarization and beam combination, so that the horizontal polarization of the two is simultaneously emitted from one input port of the first polarization beam splitter rotator 2, generating the first interference optical signal, and then reaches the output port of the sixth polarization beam splitter rotator 11-2, that are polarized and split into two polarization components, both of which are TE polarization, after passing through the first polarization rotating optical waveguide 11-8 respectively, the polarization state rotates by 90° and is changed to TM polarization, after being beam combined by the fifth polarization beam splitter 11-1 and emitted from its other input port, the polarization state of the first interference optical signal that finally output can be written as $$E_{out1}(t) = \frac{e^{j(\omega t+\varphi_0)}}{2\sqrt{2}}[A(t)+A(t-\tau)e^{-j\omega\tau}]\begin{bmatrix} \sin\theta_1 e^{j\delta_1} \\ \cos\theta_1 \end{bmatrix}.$$

The vertical polarization components of the first polarization interference component $E_{11out}(t)$ and the second polarization interference component $E_{12out}(t)$ simultaneously emit from the other input port of the first polarization beam splitter rotator 2, generating the second interference optical signal, and the polarization state that finally output is $$E_{out2}(t) = \frac{e^{j(\omega t+\varphi_0)}}{2\sqrt{2}}[A(t)-A(t-\tau)e^{-j\omega\tau}]\begin{bmatrix} \sin\theta_1 e^{j\delta_1} \\ \cos\theta_1 \end{bmatrix}.$$

The second signal optical component $E_2(t)$ enters one input port of the seventh polarization beam splitter rotator 11-3 through the optical waveguide L4, and is polarized and split into two polarization components, both of which are TE polarized, after passing through the first polarization rotating optical waveguide 11-8 respectively, the polarization state remains unchanged, and is polarized and beam combined by the eighth polarization beam splitter rotator 11-4, which is then recombined into the first signal optical component, when it reaches the other input port of the second polarization beam splitter rotator 7, the polarization state is changed to $$E_2(t) = \frac{A(t)e^{j(\omega t+\varphi_0)}}{\sqrt{2}}\begin{bmatrix} \cos\theta_2 \\ \sin\theta_2 e^{j\delta_2} \end{bmatrix},$$

subsequently, $E_2(t)$ is polarized by the first polarization beam splitter rotator 2 to generate two polarization components, both of which are TM polarized, after passing through the 45° polarization rotation structure 10, enter the polarization interferometer from two directions and propagate in both the long and short arms of the polarization interferometer with TM polarization, after the delayed self-interference similar to the first signal optical component, due to the third interference optical signal $E_{out3}(t)$ and the fourth interference optical signal $E_{out4}(t)$ generated by the TM polarized optical signal increase by π/2 after passing through the phase difference of the first quarter-wave plate 5.

The third interference optical signal is emitted from the other input port of the second polarization beam splitter rotator 7 and enters the output port of the eighth polarization beam splitter rotator 11-4, that is polarized and split into two polarization components, both of which are TE polarization, after passing through the first polarization rotating optical waveguide 11-8 respectively, the polarization state of the two rotates by 90° and is changed to TM polarization, after being beam combined by the seventh polarization beam splitter 11-3 and emitted from its other input port, the polarization state of the third interference optical signal that finally output can be written as $$E_{out3}(t) = \frac{e^{j(\omega t+\varphi_0)}}{2\sqrt{2}}[A(t)+jA(t-\tau)e^{-j\omega\tau}]\begin{bmatrix} \sin\theta_2 e^{j\delta_2} \\ \cos\theta_2 \end{bmatrix}.$$

The fourth interference optical signal is emitted from the other output port of the second polarization beam splitter rotator 7, the polarization state is $$E_{out4}(t) = \frac{e^{j(\omega t+\varphi_0)}}{2\sqrt{2}}\left[A(t) - jA(t-\tau)e^{-j\omega t}\right]\begin{bmatrix} \sin\theta_2 e^{j\delta_2} \\ \cos\theta_2 \end{bmatrix}.$$

By balancing and detecting differential current signals generated by the first interference optical signal, the second interference optical signal, the third interference optical signal, and the fourth interference optical signal, the in-phase component and the quadrature phase component of the signal can be obtained, which can be respectively written as $$I_I(t) = R\left[|E_{out1}(t)|^2 - |E_{out2}(t)|^2\right] = \frac{R}{2}|E(t)||E(t-\tau)|\cos(\omega\tau)$$

$$= \frac{R}{2}A(t)A(t-\tau)\cos(\omega\tau)$$

$$I_Q(t) = R\left[|E_{out3}(t)|^2 - |E_{out4}(t)|^2\right] = \frac{R}{2}|E(t)||E(t-\tau)|\sin(\omega\tau)$$

$$= \frac{R}{2}A(t)A(t-\tau)\sin(\omega\tau)$$

wherein, R is the response efficiency of the photoelectric detector, ω is the angular frequency of the signal optical.

Finally, electrical signals of the in-phase component and the quadrature phase component are combined into the complex signal, which can be written as $$u(t) = I_I(t) + jI_Q(t) = \frac{R}{2}E(t)E^*(t-\tau)$$

by sampling and digital signal processing the above complex signal, the electric field information of the signal optical can be recovered and the business data can be obtained.

Figure 6:
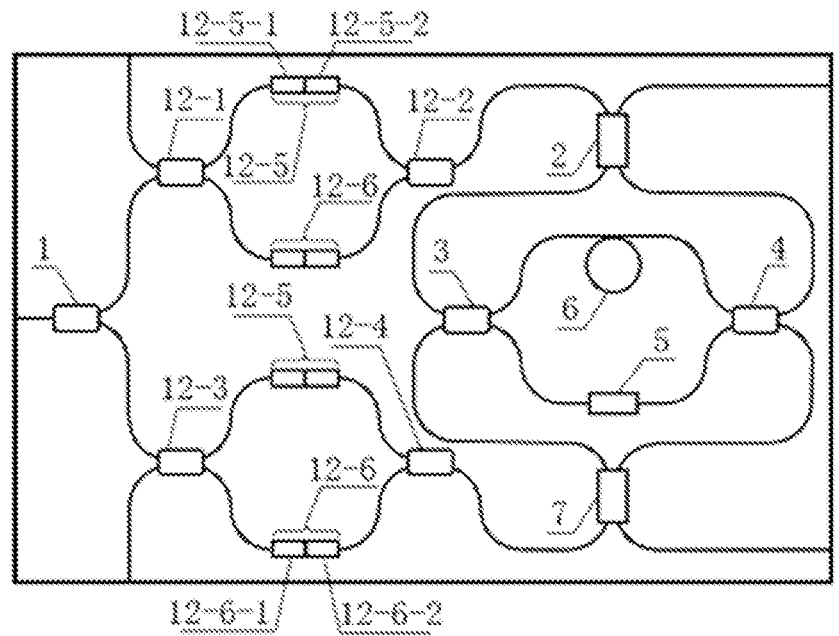
FIG. 6 is a structural principle block view of embodiment 3 of the polarization independent DQPSK demodulation integrated optical chip according to the present application.

Referring to FIG. 6, an embodiment 3 of the polarization independent DQPSK demodulation integrated optical chip according to the present application:

the polarization independent DQPSK demodulation integrated optical chip, includes the first beam splitter 1, the first polarization beam splitter rotator 2, the second beam splitter 3, the third beam splitter 4, the first quarter-wave plate 5, the first delayed optical waveguide 6, and the second polarization beam splitter rotator 7 that are integrated on the same substrate, the two output ports of the first beam splitter 1 are respectively connected to one input port of the first polarization beam splitter rotator 2 and one input port of the second polarization beam splitter rotator 7 through the optical waveguide L3 and the optical waveguide L4; the two output ports of the first polarization beam splitter rotator 2 are respectively connected to one input port of the second beam splitter 3 and one input port of the third beam splitter 4 through the optical waveguide; two output ports of the second polarization beam splitter rotator 7 are respectively connected to the other input port of the second beam splitter 3 and the other input port of the third beam splitter 4 through the optical waveguide; the two output ports of the second beam splitter 3 are respectively connected to the two output ports of the third beam splitter 4 through the first quarter-wave plate 5 and the first delayed optical waveguide 6, forming the delay interferometer;

the first beam splitter 1 is configured to split an input signal optical to generate the first signal optical component and the second signal optical component;

the first polarization beam splitter rotator 2 is configured to perform the polarization beam splitting of the first signal optical component incident to one of its input ports, generating the first polarization component and the second polarization component that are both TE polarization;

the second polarization beam splitter rotator 7 is configured to perform the polarization beam splitting of the second signal optical component incident to one of its input ports, generating the third polarization component and the fourth polarization component, both of which are TM polarized;

the delay interferometer is configured to perform the delayed self-interference of the first polarization component incident to one input port of the second beam splitter 3, generating the first interference component and the second interference component to be emitted from the two input ports of the third beam splitter 4, respectively; and to perform the delayed self-interference of the second polarization component incident to one input port of the third beam splitter 4, generating the third interference component and the fourth interference component to be emitted from the two input ports of the second beam splitter 3, respectively;

the delay interferometer is further configured to perform the delayed self-interference of the third polarization component incident to the other input port of the second beam splitter 3, generating the fifth interference component and the sixth interference component to be emitted from the two input ports of the third beam splitter 4, respectively; and to perform the delayed self-interference of the fourth polarization component incident to the other input port of the third beam splitter 4, generating the seventh interference component and the eighth interference component to be emitted from the two input ports of the second beam splitter 3, respectively;

the main axis direction of the first quarter-wave plate 5 has the angle of 0° with TE polarization, such that a phase of a TM polarized optical signal is increased by π/2 and a phase of a TE polarized optical signal remains unchanged when passing through the first quarter-wave plate;

the first delayed optical waveguide 6 is configured to increase the delay of the optical signal passing through by τ;

the first polarization beam splitter rotator 2 is further configured to perform the polarization and beam combination on the first interference component and the third interference component of TE polarization to generate the first interference optical signal; and to perform the polarization and beam combination on the fifth interference component and the seventh interference component, both of which are TM polarized to generate the third interference optical signal;

the second polarization beam splitter rotator 7 is configured to perform the polarization and beam combination on the second interference component and the fourth interference component of TE polarization to generate the second interference optical signal; and to perform the polarization and beam combination on the sixth interference component and the eighth interference component, both of which are TM polarized to generate the fourth interference optical signal.

The optical waveguide L3 is provided with a fourth beam splitter 12-1 and a fifth beam splitter 12-2, the optical waveguide L4 is provided with a sixth beam splitter 12-3 and a seventh beam splitter 12-4;

two output ports of the fourth beam splitter 12-1 are respectively connected to two input ports of the fifth beam splitter 12-2 through the optical waveguide, forming a third equal arm interferometer; two output ports of the sixth beam splitter 12-3 are respectively connected to the two input ports of the seventh beam splitter 12-4 through the optical waveguide, forming a fourth equal arm interferometer;

the optical waveguides of upper arms of the third and fourth equal arm interferometers are both provided with a second polarization rotating optical waveguide 12-5; the optical waveguides of lower arms of the third and fourth equal arm interferometers are both provided with a third polarization rotating optical waveguide 12-6;

the second polarization rotating optical waveguide 12-5 is composed of a second half wave plate optical waveguide 12-5-1 and a second faraday rotatory waveguide 12-5-2, which are closely connected in sequence, an angle between a main axis direction of the second half wave plate optical waveguide 12-5-1 and the horizontal direction is 22.5°, and a polarization rotation angle of the second faraday rotatory waveguide 12-5-2 is 45°;

the third polarization rotating optical waveguide 12-6 is composed of a third faraday rotatory waveguide 12-6-1 and a third half wave plate optical waveguide 12-6-2, which are closely connected in sequence, a polarization rotation angle of the third faraday rotatory waveguide 12-6-1 is 45°, an angle between a main axis direction of the third half wave plate optical waveguide 12-6-2 and the horizontal direction is −22.5°;

the second polarization rotating optical waveguide 12-5 is configured to rotate the polarization of an optical signal passing in a forward direction by 180° and the polarization of the optical signal passing in a reverse direction by 90°;

the third polarization rotating optical waveguide 12-6 is configured to rotate the polarization of the optical signal passing in a forward direction by 180° and the polarization of the optical signal passing in a reverse direction by −90°;

the third equal arm interferometer is configured to cause the first signal optical component incident from one input port of the fourth beam splitter 12-1 to emit from the output port of the fifth beam splitter 12-2, and to cause the first interference optical signal incident from the output port of the fifth beam splitter 12-2 to emit from the other output port of the fourth beam splitter 12-1;

the fourth equal arm interferometer is configured to cause the second signal optical component incident from one input port of the sixth beam splitter 12-3 to emit from the output port of the seventh beam splitter 12-4, and to cause the third interference optical signal incident from the output port of the seventh beam splitter 12-4 to emit from the other output port of the sixth beam splitter 12-3;

The specific working principle of the embodiment 3 is as follows:

the signal optical E(t) received by the receiving device first enters the first beam splitter 1 and is split into the first signal optical component $E_1(t)$ and the second signal optical component $E_2(t)$, meeting the requirement of $E_1(t)=E_2(t)=1/\sqrt{2}E(t)$.

The first signal optical component $E_1(t)$ passes through the optical waveguide L3 and reaches one input port of the fourth beam splitter 12-1, and is split into the first component and the second component with equal amplitude, after passing through the second polarization rotating optical waveguide 12-5 and the third polarization rotating optical waveguide 12-6 respectively, the polarization state is rotated 180°, and interference is performed at the fifth beam splitter 12-2, which is then recombined into the first signal optical component, when it is emitted from the output port of the fifth beam splitter 12-2 and reaches one input port of the first polarization beam splitter rotator 2, the polarization state is changed to $$E_1(t) = \frac{A(t)e^{j(\omega t+\varphi_0)}}{\sqrt{2}} \begin{bmatrix} \cos\theta_1 \\ \sin\theta_1 e^{j\delta_1} \end{bmatrix},$$

wherein, $\theta_1$ is the angle between the horizontal polarization component and the vertical polarization component of the first signal optical component, $\delta_1$ is the phase difference between the two. Subsequently, it is polarized and split by the first polarization beam splitter rotator 2, generating both the first polarization component $E_{11}(t)$ and the second polarization component $E_{12}(t)$ with TE polarization.

Wherein, $E_{11}(t)$ enters the delay interferometer from one input port of the second beam splitter 3 and performs self-interference at the third beam splitter 4, generating the first interference component and the second interference component, respectively, which are emitted from the two input ports of the third beam splitter 4, both of which can be written as $$E_{11out1}(t) = \frac{e^{j(\omega t+\varphi_0)}\cos\theta_1}{2\sqrt{2}}\left[A(t) + A(t-\tau)e^{-j\omega t}\right]$$

$$E_{11out2}(t) = \frac{e^{j(\omega t+\varphi_0)}\cos\theta_1}{2\sqrt{2}}\left[A(t) - A(t-\tau)e^{-j\omega t}\right]$$

wherein, $\tau$ is the delay corresponding to the difference in arm length between the long and short arms of the delay interferometer.

$E_{12}(t)$ enters the delay interferometer from one input port of the third beam splitter 4 in the opposite direction, and performs self-interference at the second beam splitter 3, generating the third interference component and the fourth interference component, they are emitted from the two input ports of the second beam splitter 3, which can be written as $$E_{12out1}(t) = \frac{e^{j(\omega t+\varphi_0)}\sin\theta_1 e^{j\delta_1}}{2\sqrt{2}}\left[A(t) + A(t-\tau)e^{-j\omega t}\right]$$

$$E_{12out2}(t) = \frac{e^{j(\omega t+\varphi_0)}\sin\theta_1 e^{j\delta_1}}{2\sqrt{2}}\left[A(t) - A(t-\tau)e^{-j\omega t}\right].$$

The first interference component and the third interference component simultaneously enter the first polarization beam splitter rotator 2 to perform the polarization and beam combination, generating the first interference optical signal, which is emitted from the port where the first signal optical component is incident, and then reaches the output port of the fifth beam splitter 12-2, and is split into two equal amplitude third and the fourth components, after passing through the second polarization rotating optical waveguide 12-5 and the third polarization rotating optical waveguide 12-6 respectively, the polarization state is rotated by 90° and −90°, after interference at the fourth beam splitter 12-1, it is emitted from the other input port, the polarization state of the final output first interference optical signal that finally output can be written as $$E_{out1}(t) = \frac{e^{j(\omega t+\varphi_0)}}{2\sqrt{2}}\left[A(t) + A(t-\tau)e^{-j\omega t}\right]\begin{bmatrix} \sin\theta_1 e^{j\delta_1} \\ \cos\theta_1 \end{bmatrix}.$$

The second interference component and the fourth interference component simultaneously enter the second polarization beam splitter rotator 7 to perform the polarization and beam combination, generating the second interference optical signal that emits from its other output port, the polarization state of the second interference optical signal is $$E_{out2}(t) = \frac{e^{j(\omega t + \varphi_0)}}{2\sqrt{2}}[A(t) - A(t-\tau)e^{-j\omega t}]\begin{bmatrix}\sin\theta_1 e^{j\delta_1}\\ \cos\theta_1\end{bmatrix}.$$

The second signal optical component $E_2(t)$ enters one input port of the sixth beam splitter 12-3 through the optical waveguide L2, and is split into two equal amplitude fifth and the sixth components, after passing through the second polarization rotating optical waveguide 12-5 and the third polarization rotating optical waveguide 12-6 respectively, the polarization state is rotated by 180°, after interference at the seventh beam splitter 12-4, which is then recombined into the first signal optical component, when it emits from the output port of the seventh beam splitter 12-4 and reaches one input port of the second polarization beam splitter rotator 7, the polarization state is changed to $$E_2 = \frac{A(t)e^{j(\omega t + \varphi_0)}}{\sqrt{2}}\begin{bmatrix}\cos\theta_2\\ \sin\theta_2 e^{j\delta_2}\end{bmatrix},$$

subsequently, $E_2(t)$ is polarized by the second polarization beam splitter rotator 7 to generate two polarization components, both of which are TM polarized, after the delayed self-interference similar to the first signal optical component, due to the third interference optical signal $E_{out3}(t)$ and the fourth interference optical signal $E_{out4}(t)$ generated by the TM polarized optical signal increase by π/2 after passing through the phase difference of the first quarter-wave plate 5.

Wherein the third interference optical signal is emitted from the input port of the second signal optical incident to the polarization beam splitter rotator 7, and enters the output port of the seventh beam splitter 12-4, and is split into two equal amplitude seventh and eighth components, after passing through the second polarization beam splitter 12-5 and the third polarization beam splitter 12-6, the polarization state is rotated by 90° and −90° respectively, after interference at the sixth beam splitter 12-3, it emits from its other input port, the polarization state of the first interference optical signal that finally output can be written as $$E_{out3}(t) = \frac{e^{j(\omega t + \varphi_0)}}{2\sqrt{2}}[A(t) + jA(t-\tau)e^{-j\omega t}]\begin{bmatrix}\sin\theta_2 e^{j\delta_2}\\ \cos\theta_2\end{bmatrix}.$$

The fourth interference optical signal is emitted from the other output port of the first polarization beam splitter rotator 2, the polarization state is $$E_{out4}(t) = \frac{e^{j(\omega t + \varphi_0)}}{2\sqrt{2}}[A(t) - jA(t-\tau)e^{-j\omega t}]\begin{bmatrix}\sin\theta_2 e^{j\delta_2}\\ \cos\theta_2\end{bmatrix}.$$

By balancing and detecting differential current signals generated by the first interference optical signal, the second interference optical signal, the third interference optical signal, and the fourth interference optical signal, the in-phase component and the quadrature phase component of the signal can be obtained, which can be respectively written as $$I_I(t) = R[|E_{out1}(t)|^2 - |E_{out2}(t)|^2] = \frac{R}{2}|E(t)||E(t-\tau)|\cos(\omega\tau)$$

$$= \frac{R}{2}A(t)A(t-\tau)\cos(\omega\tau)$$

$$I_Q(t) = R[|E_{out3}(t)|^2 - |E_{out4}(t)|^2] = \frac{R}{2}|E(t)||E(t-\tau)|\sin(\omega\tau)$$

$$= \frac{R}{2}A(t)A(t-\tau)\sin(\omega\tau)$$

wherein, R is the response efficiency of the photoelectric detector, ω is the angular frequency of the signal optical.

Finally, electrical signals of the in-phase component and the quadrature phase component are combined into the complex signal, which can be written as $$u(t) = I_I(t) + jI_Q(t) = \frac{R}{2}E(t)E^*(t-\tau)$$

by sampling and digital signal processing the above complex signal, the electric field information of the signal optical can be recovered and the business data can be obtained.

Figure 7:
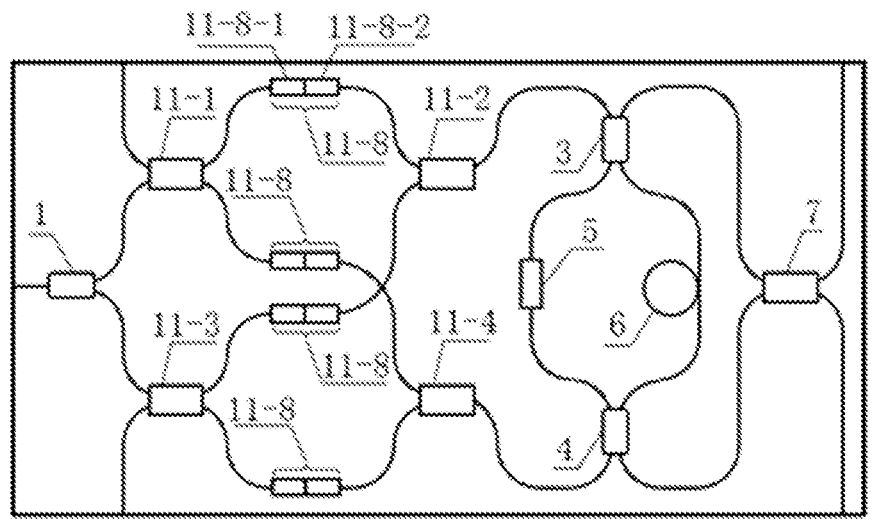
FIG. 7 is a structural principle block view of embodiment 4 of the polarization independent DQPSK demodulation integrated optical chip according to the present application.

Referring to FIG. 7, an embodiment 4 of the polarization independent DQPSK demodulation integrated optical chip according to the present application:

the polarization independent DQPSK demodulation integrated optical chip, includes the first beam splitter 1, the second beam splitter 3, the third beam splitter 4, the first quarter-wave plate 5, the first delayed optical waveguide 6, the second polarization beam splitter rotator 7, the fifth polarization beam splitter rotator 11-1, the sixth polarization beam splitter rotator 11-2, the seventh polarization beam splitter rotator 11-3, and the eighth polarization beam splitter rotator 11-3 that are integrated on the same substrate, the two output ports of the first beam splitter 1 are respectively connected to one input port of the fifth polarization beam splitter rotator 11-1 and one input port of the seventh polarization beam splitter rotator 11-3 through the optical waveguide; the two output ports of the fifth polarization beam splitter rotator 11-1 are respectively connected to one input port of the sixth polarization beam splitter rotator 11-2 and one input port of the eighth polarization beam splitter rotator 11-4 through the first polarization rotating optical waveguide 11-8; the two output ports of the seventh polarization beam splitter rotator 11-3 are respectively connected to the other input port of the sixth polarization beam splitter rotator 11-2 and the other input port of the eighth polarization beam splitter rotator 11-4 through the first polarization rotating optical waveguide 11-8; the output ports of the sixth polarization beam splitter rotator 11-2 and the eighth polarization beam splitter rotator 11-4 are respectively connected to one input port of the second beam splitter 3 and one input port of the third beam splitter 4 through the optical waveguide; the two input ports of the second polarization beam splitter rotator 7 are respectively connected to the other input port of the second beam splitter 3 and the other input port of the third beam splitter 4 through the optical waveguide; the two output ports of the second beam splitter 3 are respectively connected to the two output ports of the third beam splitter 4 through the first quarter-wave plate 5 and the first delayed optical waveguide 6, forming the delay interferometer;

the first polarization rotating optical waveguide 11-8 is composed of the first half wave plate optical waveguide 11-8-1 and the first faraday rotatory waveguide 11-8-2, which are closely connected in sequence, the angle between the main axis direction of the first half wave plate optical waveguide 11-8-1 and the horizontal direction is 22.5°, and the polarization rotation angle of the first faraday rotatory waveguide 11-8-2 is 45°;

the first polarization rotating optical waveguide 11-8 is configured to rotate the polarization of the optical signal passing in a reverse direction by 90°, and the polarization state of the optical signal passing in a forward direction remains unchanged;

the first beam splitter 1 is configured for splitting the input signal optical to generate the first signal optical component and the second signal optical component;

the fifth polarization beam splitter rotator 11-1 is configured to perform the polarization beam splitting of the first signal optical component incident to one of its input ports, generating the first polarization component and the second polarization component that are both TE polarization; the seventh polarization beam splitter rotator 11-3 is configured to perform the polarization beam splitting of the second signal optical component incident to one of its input ports, generating the third polarization component and the fourth polarization component that are both TE polarized;

the sixth polarization beam splitter rotator 11-2 is configured to combine the first polarization component and the third polarization component for beam output; the eighth polarization beam splitter rotator 11-4 is configured to combine the second polarization component and the fourth polarization component for beam output;

the delay interferometer is configured to perform the delayed self-interference of the first polarization component incident to one input port of the second beam splitter 3, generating the first interference component and the second interference component to be emitted from the two input ports of the third beam splitter 4, respectively; and to perform the delayed self-interference of the second polarization component incident to one input port of the third beam splitter 4, generating the third interference component and the fourth interference component to be emitted from the two input ports of the second beam splitter 3, respectively;

the delay interferometer is further configured to perform the delayed self-interference of the third polarization component incident to one input port of the second beam splitter 3, generating the fifth interference component and the sixth interference component to be emitted from the two input ports of the third beam splitter 4, respectively; and to perform the delayed self-interference of the fourth polarization component incident to one input port of the third beam splitter 4, generating the seventh interference component and the eighth interference component to be emitted from the two input ports of the second beam splitter 3, respectively;

the main axis direction of the first quarter-wave plate 5 has the angle of 0° with TE polarization, such that a phase of a TM polarized optical signal is increased by $\pi/2$ and a phase of a TE polarized optical signal remains unchanged when passing through the first quarter-wave plate;

the first delayed optical waveguide 6 is configured to increase the delay of the optical signal passing through by $\tau$;

the sixth polarization beam splitter rotator 11-2 is further configured for transmitting the third interference component and reflecting the seventh interference component; the eighth polarization beam splitter rotator 11-4 is further configured for transmitting the first interference component and reflecting the fifth interference component;

the fifth polarization beam splitter rotator 11-1 is further configured to perform the polarization and beam combination on the third interference component and the first interference component, generating the first interference optical signal emitted from its other input port; the seventh polarization beam splitter rotator 11-3 is further configured to perform the polarization and beam combination on the seventh interference component and the fifth interference component, generating the third interference optical signal emitted from its other input port;

the second polarization beam splitter rotator 7 is configured to perform the polarization and beam combination on the second interference component and the fourth interference component, generating the second interference optical signal emitted from its other input port; and to perform the polarization and beam combination on the sixth interference component and the eighth interference component, generating the fourth interference optical signal emitted from its other input port;

The specific working principle of the embodiment 4 is as follows:

the signal optical E(t) received by the receiving device first enters the first beam splitter 1 and is split into the first signal optical component $E_1(t)$ and the second signal optical component $E_2(t)$, meeting the requirement of $E_1(t)=E_2(t)=1/\sqrt{2}E(t)$.

The first signal optical component $E_1(t)$ passes through the optical waveguide L1 and reaches the fifth polarization beam splitter rotator 11-1, which is polarized and split, generating the first polarization component of the first signal optical and the second polarization component of the first signal optical, both of which are TE polarized, after passing through the first polarization rotating optical waveguide 11-8 respectively, the polarization state remains unchanged. Wherein, the first polarization component of the first signal optical enters one input port of the sixth polarization beam splitter rotator 11-2 and emits from its output port, still in TE polarization, which can be written as $$E_{11}(t) = \frac{A(t)e^{j(\omega t+\varphi_0)}\cos\theta_1}{\sqrt{2}},$$

wherein, $\theta_1$ is the angle between the horizontal polarization component and the vertical polarization component of the first signal optical component.

$E_{11}(t)$ enters the delay interferometer from one input port of the second beam splitter 3 and performs self-interference at the third beam splitter 4, generating the first interference component and the second interference component, respectively, which are emitted from the two input ports of the third beam splitter 4, both of which can be written as $$E_{11out1}(t) = \frac{e^{j(\omega t+\varphi_0)}\cos\theta_1}{2\sqrt{2}}\left[A(t) + A(t-\tau)e^{-j\omega\tau}\right]$$

$$E_{11out2}(t) = \frac{e^{j(\omega t+\varphi_0)}\cos\theta_1}{2\sqrt{2}}\left[A(t) - A(t-\tau)e^{-j\omega\tau}\right]$$

wherein, τ is the delay corresponding to the difference in arm length between the long and short arms of the delay interferometer.

The second polarization component of the first signal optical enter one input port of the eighth polarization beam splitter rotator 11-4 and emits from its output port, which is still in TE polarization and can be written as $$E_{12}(t) = \frac{A(t)e^{j(\omega t+\varphi_0)}\sin\theta_1 e^{j\delta_1}}{\sqrt{2}}$$

wherein, $\delta_1$ is the phase difference between the horizontal polarization component and the vertical polarization component of the first signal optical component.

$E_{12}(t)$ enters the delay interferometer from one input port of the third beam splitter 4 and performs self-interference at the second beam splitter 3, generating the third interference component and the fourth interference component, which are emitted from the two input ports of the third beam splitter 4 respectively, both of which can be written as $$E_{12out1}(t) = \frac{e^{j(\omega t+\varphi_0)}\sin\theta_1 e^{j\delta_1}}{2\sqrt{2}}\left[A(t) + A(t-\tau)e^{-j\omega\tau}\right]$$

$$E_{12out2}(t) = \frac{e^{j(\omega t+\varphi_0)}\sin\theta_1 e^{j\delta_1}}{2\sqrt{2}}\left[A(t) - A(t-\tau)e^{-j\omega\tau}\right].$$

The first interference component is emitted from one input port of the third beam splitter 4 and reaches the output port of the eighth polarization beam splitter rotator 11-4, after being transmitted to one of its input ports, it remains TE polarized, then, it reversely passes through the first polarization rotating optical waveguide 11-8 and rotates by 90° to become TM polarized, reaching one output port of the fifth polarization beam splitter rotator 11-1; the third interference component emits from one input port of the second beam splitter 3 and reaches the output port of the sixth polarization beam splitter rotator 11-2, after being transmitted to one of its input ports, it remains TE polarized. then, it reversely passes through the first polarization rotating optical waveguide 11-8 and rotates by 90° to become TM polarized, reaching the other output port of the fifth polarization beam splitter rotator 11-1. The first interference component and the third interference component are combined by the polarization of the fifth polarization beam splitter rotator 11-1 and then emitted from the other input port, generating the first interference optical signal, the polarization state can be written as $$E_{out1}(t) = \frac{e^{j(\omega t+\varphi_0)}}{2\sqrt{2}}\left[A(t) + A(t-\tau)e^{-j\omega\tau}\right]\begin{bmatrix}\sin\theta_1 e^{j\delta_1}\\ \cos\theta_1\end{bmatrix}.$$

The second interference component and the fourth interference component simultaneously enter the second polarization beam splitter rotator 7 for polarization beam combining, generating the second interference optical signal that emits from one of its output ports, the polarization state of the second interference optical signal is $$E_{out2}(t) = \frac{e^{j(\omega t+\varphi_0)}}{2\sqrt{2}}\left[A(t) - A(t-\tau)e^{-j\omega\tau}\right]\begin{bmatrix}\sin\theta_1 e^{j\delta_1}\\ \cos\theta_1\end{bmatrix}.$$

The second signal optical component $E_2(t)$ enters one input port of the seventh polarization beam splitter rotator 11-3 through the optical waveguide L2, generating the first polarization component of the second signal optical and the second polarization component of the second signal optical, both of which are TE polarized, after passing through the first polarization rotating optical waveguide 11-8, the polarization state remains unchanged. Wherein, the first polarization component of the second signal optical enters the other input port of the sixth polarization beam splitter rotator 11-2 and emits from its output port, changing to TM polarization, which can be written as $$E_{21}(t) = \frac{A(t)e^{j(\omega t+\varphi_0)}\cos\theta_2}{\sqrt{2}},$$

wherein, $\theta_2$ is the angle between the horizontal polarization component and the vertical polarization component of the second signal optical component.

$E_{21}(t)$ enters the delay interferometer from one input port of the second beam splitter 3, due to the increase of π/2 in phase difference of the TM polarized optical signal through the first quarter-wave plate 5, the self-interference is performed at the third beam splitter 4, generating the fifth interference component and the sixth interference component, that emit from the two input ports of the third beam splitter 4 respectively, the two can be written as $$E_{21out1}(t) = \frac{e^{j(\omega t+\varphi_0)}\cos\theta_2}{2\sqrt{2}}\left[A(t) + jA(t-\tau)e^{-j\omega\tau}\right]$$

$$E_{21out2}(t) = \frac{e^{j(\omega t+\varphi_0)}\cos\theta_2}{2\sqrt{2}}\left[A(t) - jA(t-\tau)e^{-j\omega\tau}\right].$$

The second polarization component of the second signal light enters one input port of the eighth polarization beam splitter rotator 11-4 and emits from its output port, changing to TM polarization, which can be written as $$E_{22}(t) = \frac{A(t)e^{j(\omega t+\varphi_0)}\sin\theta_2 e^{j\delta_2}}{\sqrt{2}},$$

wherein, $\delta_2$ is the phase difference between the horizontal polarization component and the vertical polarization component of the first signal optical component.

$E_{22}(t)$ enters the delay interferometer from one input port of the third beam splitter 4, due to the increase of π/2 in phase difference of the TM polarized optical signal through the first quarter-wave plate 5, the self-interference is performed at the second beam splitter 3, generating the seventh interference component and the eighth interference component, that emit from the two input ports of the second beam splitter 3 respectively, the two can be written as $$E_{22out1}(t) = \frac{e^{j(\omega t+\varphi_0)}\sin\theta_2 e^{j\delta_2}}{2\sqrt{2}}\left[A(t) + jA(t-\tau)e^{-j\omega\tau}\right]$$

$$E_{22out2}(t) = \frac{e^{j(\omega t+\varphi_0)}\sin\theta_2 e^{j\delta_2}}{2\sqrt{2}}\left[A(t) - jA(t-\tau)e^{-j\omega\tau}\right].$$

The fifth interference component is emitted from one input port of the third beam splitter 4 and reaches the output port of the eighth polarization beam splitter rotator 11-4, after being reflected to one of its input ports, it becomes TE polarized, then, it reversely passes through the first polarization rotating optical waveguide 11-8 and rotates by 90° to become TM polarized, reaching one output port of the seventh polarization beam splitter rotator 11-3; the seventh interference component emits from one input port of the second beam splitter 3 and reaches the output port of the sixth polarization beam splitter rotator 11-2, after being reflected to one of its input ports, it becomes TE polarized, then, it reversely passes through the first polarization rotating optical waveguide 11-8 and rotates by 90° to become TM polarized, reaching the other output port of the seventh polarization beam splitter rotator 11-1. The fifth interference component and the seventh interference component are combined by the polarization of the seventh polarization beam splitter rotator 11-3 and then emitted from the other input port, generating the third interference optical signal, the polarization state can be written as $$E_{out3}(t) = \frac{e^{j(\omega t+\varphi_0)}}{2\sqrt{2}}\left[A(t) + jA(t-\tau)e^{-j\omega\tau}\right]\begin{bmatrix}\sin\theta_2 e^{j\delta_2}\\\cos\theta_2\end{bmatrix}.$$

The sixth and eighth interference components simultaneously enter the second polarization beam splitter rotator 7 to perform the polarization and beam combination, generating the fourth interference optical signal that emits from its other output port, the polarization state of the fourth interference optical signal is $$E_{out4}(t) = \frac{e^{j(\omega t+\varphi_0)}}{2\sqrt{2}}\left[A(t) - jA(t-\tau)e^{-j\omega\tau}\right]\begin{bmatrix}\sin\theta_2 e^{j\delta_2}\\\cos\theta_2\end{bmatrix}.$$

By balancing and detecting differential current signals generated by the first interference optical signal, the second interference optical signal, the third interference optical signal, and the fourth interference optical signal, the in-phase component and the quadrature phase component of the signal can be obtained, which can be respectively written as $$I_I(t) = R\left[|E_{out1}(t)|^2 - |E_{out2}(t)|^2\right] = \frac{R}{2}|E(t)||E(t-\tau)|\cos(\omega\tau)$$
$$= \frac{R}{2}A(t)A(t-\tau)\cos(\omega\tau)$$

$$I_Q(t) = R\left[|E_{out3}(t)|^2 - |E_{out4}(t)|^2\right] = \frac{R}{2}|E(t)||E(t-\tau)|\sin(\omega\tau)$$
$$= \frac{R}{2}A(t)A(t-\tau)\sin(\omega\tau)$$

wherein, R is the response efficiency of the photoelectric detector, ω is the angular frequency of the signal optical.

Finally, electrical signals of the in-phase component and the quadrature phase component are combined into the complex signal, which can be written as $$u(t) = I_I(t) + jI_Q(t) = \frac{R}{2}E(t)E^*(t-\tau)$$

by sampling and digital signal processing the above complex signal, the electric field information of the signal optical can be recovered and the business data can be obtained.

Based on the various embodiments of the present application, it can be seen that the present application provides the polarization independent DQPSK demodulation integrated optical chip, which only requires a delay interferometer to measure the in-phase component and the quadrature phase component of the signal optical, reducing a difficulty and complexity of an electronic signal processing after a balanced detection, and thus greatly reducing the complexity of the receiving end. In addition, by allowing the two orthogonal polarization components of the signal optical to pass through the same delay interferometer in opposite directions for self-interference, and polarizing the interference results into beams, polarization independent stable self coherent reception can be achieved, without a need to actively calibrate the polarization of the signal optical using a polarization controller, polarization independent delay self coherence of the signal optical can be achieved, eliminating an impact of a random change in the polarization state of the signal optical on a receiver, improving a stability of the receiving device

What is claimed is:

1. A polarization independent differential quadrature phase shift keying (DQPSK) demodulation integrated optical chip, comprising: a first beam splitter, a first polarization beam splitter rotator, a second beam splitter, a third beam splitter, a first quarter-wave plate, a first delayed optical waveguide, and a second polarization beam splitter rotator, all of which are integrated on a same substrate, two output ports of the first beam splitter are respectively connected to two input ports of the first polarization beam splitter rotator through a first optical waveguide and a second optical waveguide; wherein two output ports of the first polarization beam splitter rotator are respectively connected to one of two input ports of the second beam splitter and one of two input ports of the third beam splitter through third optical waveguides; two input ports of the second polarization beam splitter rotator are respectively connected to a second one of the two input ports of the second beam splitter and a second one of the two input ports of the third beam splitter through fourth optical waveguides; two output ports of the second beam splitter are respectively connected to two output ports of the third beam splitter through the first quarter-wave plate and the first delayed optical waveguide, to form a delay interferometer;

the first beam splitter is configured to split an input signal optical to generate a first signal optical component and a second signal optical component;

the first polarization beam splitter rotator is configured to perform a polarization beam splitting on the first signal optical component incident to one of the two input ports of the first polarization beam splitter rotator to generate a first polarization component and a second polarization component, both of which are transverse-electric (TE) polarized; and to perform the polarization beam splitting on the second signal optical component incident to a second one of the two input ports of the first polarization beam splitter rotator to generate a third polarization component and a fourth polarization component, both of which are transverse-magnetic (TM) polarized;

the delay interferometer is configured to perform a delayed self-interference on the first polarization component incident to the one of the two input ports of the second beam splitter to generate a first interference component and a second interference component to be emitted from the two input ports of the third beam splitter, respectively; and to perform the delayed self-interference on the second polarization component incident to the second one of the two input ports of the third beam splitter to generate a third interference component and a fourth interference component to be emitted from the two input ports of the second beam splitter, respectively;

the delay interferometer is further configured to perform the delayed self-interference on the third polarization component incident to the one of the two input ports of the second beam splitter to generate a fifth interference component and a sixth interference component to be emitted from the two input ports of the third beam splitter, respectively; and to perform the delayed self-interference on the fourth polarization component incident to the second one of the two input ports of the third beam splitter to generate a seventh interference component and an eighth interference component to be emitted from the two input ports of the second beam splitter, respectively;

a main axis direction of the first quarter-wave plate has an angle of 0° with TE polarization, such that a phase of a TM polarized optical signal is increased by $\pi/2$ and a phase of a TE polarized optical signal remains unchanged when passing through the first quarter-wave plate;

the first delayed optical waveguide is configured to increase delay of a passing optical signal by $\tau$;

the first polarization beam splitter rotator is further configured to perform a polarization and beam combination on the first interference component and the third interference component, both of which are TE polarized, to generate a first interference optical signal; and to perform the polarization and beam combination on the fifth interference component and the seventh interference component, both of which are TM polarized, to generate a third interference optical signal;

the second polarization beam splitter rotator is configured to perform the polarization and beam combination on the second interference component and the fourth interference component, both of which are TE polarized, to generate a second interference optical signal; and to perform the polarization and beam combination on the sixth interference component and the eighth interference component, both of which are TM polarized, to generate a fourth interference optical signal.

2. The polarization independent DQPSK demodulation integrated optical chip according to claim 1, wherein the first optical waveguide is provided with a third polarization beam splitter rotator and a fourth polarization beam splitter rotator, the second optical waveguide is provided with a fifth polarization beam splitter rotator and an sixth polarization beam splitter rotator, two output ports of the third polarization beam splitter rotator are respectively connected to two input ports of the fourth polarization beam splitter rotator through fifth optical waveguides to form a first equal arm interferometer; two output ports of the fifth polarization beam splitter rotator are respectively connected to two input ports of the sixth polarization beam splitter rotator through sixth optical waveguides to form a second equal arm interferometer;

a notch groove is provided on seventh optical waveguides perpendicular to four arms of the first equal arm interferometer and the second equal arm interferometer;

a half wave plate and faraday rotatory plate, which are aligned and fitted with each other, are inserted into the notch groove, an angle between a main axis of the half wave plate and a horizontal direction is 22.5°, and a polarization rotation angle of the faraday rotatory plate is 45°;

the half wave plate and the faraday rotatory plate are configured to rotate polarization of an optical signal passing in a reverse direction by 90°, and maintain a polarization state of an optical signal passing in a forward direction unchanged;

the first equal arm interferometer is configured such that the first signal optical component incident from one of two input ports of the third polarization beam splitter rotator emits from an output port of the fourth polarization beam splitter rotator, and such that the first interference optical signal incident from the output port of the fourth polarization beam splitter rotator emits from one of the two output ports of the third polarization beam splitter rotator;

the second equal arm interferometer is configured such that the second signal optical component incident from one of the two output ports of the fifth polarization beam splitter rotator emits from an output port of the sixth polarization beam splitter rotator, and such that the third interference optical signal incident from the output port of the sixth polarization beam splitter rotator emits from one of the two output ports of the fifth polarization beam splitter rotator.

3. The polarization independent DQPSK demodulation integrated optical chip according to claim 1, wherein the first optical waveguide is provided with a third polarization beam splitter rotator and a fourth polarization beam splitter rotator, the second optical waveguide is provided with a fifth polarization beam splitter rotator and a sixth polarization beam splitter rotator, two output ports of the third polarization beam splitter rotator are respectively connected to two input ports of the fourth polarization beam splitter rotator through fifth optical waveguides to form a first equal arm interferometer; two output ports of the fifth polarization beam splitter rotator are respectively connected to two input ports of the sixth polarization beam splitter rotator through sixth optical waveguides to form a second equal arm interferometer;

a first polarization rotating optical waveguide is provided on each of seventh optical waveguides of four arms of the first equal arm interferometers and the second equal arm interferometer;

the first polarization rotating optical waveguide is composed of a first half wave plate optical waveguide and a first faraday rotatory waveguide, which are connected in sequence, an angle between a main axis direction of the first half wave plate optical waveguide and a horizontal direction is 22.5, and a polarization rotation angle of the first faraday rotatory waveguide is 45°;

the first polarization rotating optical waveguide is configured to rotate polarization of an optical signal passing in a reverse direction by 90°, and maintain a polarization state of the optical signal passing in a forward direction unchanged;

the first equal arm interferometer is configured such that the first signal optical component incident from one of the two input ports of the third polarization beam splitter rotator emits from an output port of the fourth polarization beam splitter rotator, and such that the first interference optical signal incident from the output port of the fourth polarization beam splitter rotator emits from one of the two input ports of the third polarization beam splitter rotator;

the second equal arm interferometer is configured such that the second signal optical component incident from one of two input ports of the fifth polarization beam splitter rotator emits from an output port of the sixth polarization beam splitter rotator, and such that the third interference optical signal incident from the output port of the sixth polarization beam splitter rotator emits from one of the two input ports of the fifth polarization beam splitter rotator.

4. The polarization independent DQPSK demodulation integrated optical chip according to claim 1, wherein the first optical waveguide is provided with a fourth beam splitter and a fifth beam splitter, the second optical waveguide is provided with a sixth beam splitter and a seventh beam splitter;

two output ports of the fourth beam splitter are respectively connected to two input ports of the fifth beam splitter through fifth optical waveguides to form a third equal arm interferometer; two output ports of the sixth beam splitter are respectively connected to two input ports of the seventh beam splitter through sixth optical waveguides to form a fourth equal arm interferometer;

a second polarization rotating optical waveguide is provided on each of seventh optical waveguides of upper arms of the third equal arm interferometer and the fourth equal arm interferometer; a third polarization rotating optical waveguide is provided on each of eighth optical waveguides of lower arms of the third equal arm interferometer and the fourth equal arm interferometer;

the second polarization rotating optical waveguide is composed of a second half wave plate optical waveguide and a second faraday rotatory waveguide, which are connected in sequence, an angle between a main axis direction of the second half wave plate optical waveguide and a horizontal direction is 22.5°, and a polarization rotation angle of the second faraday rotatory waveguide is 45°;

the third polarization rotating optical waveguide is composed of a third faraday rotatory waveguide and a third half wave plate optical waveguide, which are connected in sequence, a polarization rotation angle of the third faraday rotatory waveguide is 45°, an angle between a main axis direction of the third half wave plate optical waveguide and the horizontal direction is −22.5°;

the second polarization rotating optical waveguide is configured to rotate polarization of an optical signal passing in a forward direction by 180° and rotate polarization of an optical signal passing in a reverse direction by 90°;

the third polarization rotating optical waveguide is configured to rotate polarization of an optical signal passing in a forward direction by 180° and polarization of an optical signal passing in a reverse direction by −90°;

the third equal arm interferometer is configured such that the first signal optical component incident from one of two input ports of the fourth beam splitter emits from an output port of the fifth beam splitter, and such that the first interference optical signal incident from the output port of the fifth beam splitter emits from one of the two input ports of the fourth beam splitter;

the fourth equal arm interferometer is configured such that the second signal optical component incident from one of two input ports of the sixth beam splitter emits from an output port of the seventh beam splitter, and such that the third interference optical signal incident from the output port of the seventh beam splitter emits from one of the two input ports of the sixth beam splitter.

5. A polarization independent differential quadrature phase shift keying (DQPSK) demodulation integrated optical chip, comprising: a first beam splitter, a first polarization beam splitter rotator, a second beam splitter, a third beam splitter, a first quarter-wave plate, a first delayed optical waveguide, and a second polarization beam splitter rotator, all of which are integrated on a same substrate, two output ports of the first beam splitter are respectively connected to one of two input ports of the first polarization beam splitter rotator and one of two input ports of the second polarization beam splitter rotator through a first optical waveguide and a second optical waveguide; two output ports of the first polarization beam splitter rotator are respectively connected to one of two input ports of the second beam splitter and one of two input ports of the third beam splitter through third optical waveguides; two output ports of the second polarization beam splitter rotator are respectively connected to one of the two input ports of the second beam splitter and one of the two input ports of the third beam splitter through fourth optical waveguides; two output ports of the second beam splitter are respectively connected to two output ports of the third beam splitter through the first quarter-wave plate and the first delayed optical waveguide to form a delay interferometer;

the first beam splitter is configured to split an input signal optical to generate a first signal optical component and a second signal optical component;

the first polarization beam splitter rotator is configured to perform a polarization beam splitting on the first signal optical component incident to one of the two input ports of the first polarization beam splitter rotator to generate a first polarization component and a second polarization component, both of which are transverse-electric (TE) polarized;

the second polarization beam splitter rotator is configured to perform a polarization beam splitting on the second signal optical component incident to one of the two input ports of the second polarization beam splitter rotator to generate a third polarization component and a fourth polarization component, both of which are transverse-magnetic (TM) polarized;

the delay interferometer is configured to perform a delayed self-interference on the first polarization component incident to one of the two input ports of the second beam splitter to generate a first interference component and a second interference component to be emitted from the two input ports of the third beam splitter, respectively; and to perform the delayed self-interference on the second polarization component incident to one of the two input ports of the third beam splitter to generate a third interference component and a fourth interference component to be emitted from the two input ports of the second beam splitter, respectively;

the delay interferometer is further configured to perform the delayed self-interference on the third polarization component incident to one of the two input ports of the second beam splitter to generate a fifth interference component and a sixth interference component to be emitted from the two input ports of the third beam splitter, respectively; and to perform the delayed self-interference on the fourth polarization component incident to one of the two input ports of the third beam splitter to generate a seventh interference component and an eighth interference component to be emitted from the two input ports of the second beam splitter, respectively;

a main axis direction of the first quarter-wave plate has an angle of 0° with TE polarization such that a phase of a TM polarized optical signal is increased by $\pi/2$, and a phase of a TE polarized optical signal remains unchanged when passing through the first quarter-wave plate;

the first delayed optical waveguide is configured to increase a delay of a passing optical signal by $\tau$;

the first polarization beam splitter rotator is further configured to perform a polarization and beam combination on the first interference component and the third interference component, both of which are TE polarized, to generate a first interference optical signal; and to perform the polarization and beam combination on the fifth interference component and the seventh interference component, both of which are TM polarized, to generate a third interference optical signal;

the second polarization beam splitter rotator is configured to perform the polarization and beam combination on the second interference component and the fourth interference component, both of which are TE polarized, to generate a second interference optical signal; and to perform the polarization and beam combination on the sixth interference component and the eighth interference component, both of which are TM polarized, to generate a fourth interference optical signal.

6. The polarization independent DQPSK demodulation integrated optical chip according to claim 5, wherein the first optical waveguide is provided with a third polarization beam splitter rotator and a fourth polarization beam splitter rotator, the second optical waveguide is provided with a fifth polarization beam splitter rotator and a sixth polarization beam splitter rotator, two output ports of the third polarization beam splitter rotator are respectively connected to two input ports of the fourth polarization beam splitter rotator through fifth optical waveguides to form a first equal arm interferometer; two output ports of the fifth polarization beam splitter rotator are respectively connected to two input ports of the sixth polarization beam splitter rotator through sixth optical waveguides to form a second equal arm interferometer;

a notch groove is provided on seventh optical waveguides perpendicular to four arms of the first equal arm interferometer and the second equal arm interferometer;

a half wave plate and faraday rotatory plate, which are aligned and fitted with each other, are inserted into the notch groove, an angle between a main axis of the half wave plate and a horizontal direction are 22.5", and a polarization rotation angle of the faraday rotatory plate is 45°:

the half wave plate and the faraday rotatory plate are configured to rotate polarization of an optical signal passing in a reverse direction by 90°, and maintain a polarization state of an optical signal passing in a forward direction unchanged;

the first equal arm interferometer is configured such that the first signal optical component incident from one of two input ports of the third polarization beam splitter rotator emits from an output port of the fourth polarization beam splitter rotator, and such that the first interference optical signal incident from the output port of the fourth polarization beam splitter rotator emits from one of the two output ports of the third polarization beam splitter rotator;

the second equal arm interferometer is configured such that the second signal optical component incident from one of the two output ports of the fifth polarization beam splitter rotator emits from the output port of the sixth polarization beam splitter rotator, and such that the third interference optical signal incident from the output port of the sixth polarization beam splitter rotator emits from one of the two output ports of the fifth polarization beam splitter rotator.

7. The polarization independent DQPSK demodulation integrated optical chip according to claim 5, wherein the first optical waveguide is provided with a third polarization beam splitter rotator and a fourth polarization beam splitter rotator, the second optical waveguide is provided with a fifth polarization beam splitter rotator and a sixth polarization beam splitter rotator, two output ports of the third polarization beam splitter rotator are respectively connected to two input ports of the fourth polarization beam splitter rotator through fifth optical waveguides to form a first equal arm interferometer; two output ports of the fifth polarization beam splitter rotator are respectively connected to two input ports of the sixth polarization beam splitter rotator through sixth optical waveguides to form a second equal arm interferometer;

a first polarization rotating optical waveguide is provided on each of seventh optical waveguides of four arms of the first equal arm interferometer and the second equal arm interferometer;

the first polarization rotating optical waveguide is composed of a first half wave plate optical waveguide and a first faraday rotatory waveguide, which are connected in sequence, an angle between a main axis direction of the first half wave plate optical waveguide and a horizontal direction is 22.5, and a polarization rotation angle of the first faraday rotatory waveguide is 45°;

the first polarization rotating optical waveguide is configured to rotate polarization of an optical signal passing in a reverse direction by 90, and maintain a polarization state of the optical signal passing in a forward direction unchanged;

the first equal arm interferometer is configured such that the first signal optical component incident from one of two input ports of the third polarization beam splitter rotator emits from an output port of the fourth polarization beam splitter rotator, and such that the first interference optical signal incident from the output port of the fourth polarization beam splitter rotator emits from one of the two input ports of the third polarization beam splitter rotator;

the second equal arm interferometer is configured such that the second signal optical component incident from one of two input ports of the fifth polarization beam splitter rotator emits from an output port of the sixth polarization beam splitter rotator, and such that the third interference optical signal incident from the output port of the sixth polarization beam splitter rotator emits from one of the two input ports of the fifth polarization beam splitter rotator.

8. The polarization independent DQPSK demodulation integrated optical chip according to claim 5, wherein the first optical waveguide is provided with a fourth beam splitter and a fifth beam splitter, the second optical waveguide is provided with a sixth beam splitter and a seventh beam splitter;

two output ports of the fourth beam splitter are respectively connected to two input ports of the fifth beam splitter through fourth optical waveguides to form a third equal arm interferometer; two output ports of the sixth beam splitter are respectively connected to two input ports of the seventh beam splitter through fifth optical waveguides to form a fourth equal arm interferometer;

a second polarization rotating optical waveguide is provided on each of sixth optical waveguides of upper arms of the third equal arm interferometer and the fourth equal arm interferometer; a third polarization rotating optical waveguide is provided on each of seventh optical waveguides of lower arms of the third equal arm interferometer and the fourth equal arm interferometer;

the second polarization rotating optical waveguide is composed of a second half wave plate optical waveguide and a second faraday rotatory waveguide, which are connected in sequence, an angle between a main axis direction of the second half wave plate optical waveguide and a horizontal direction is 22.5°, and a polarization rotation angle of the second faraday rotatory waveguide is 45°;

the third polarization rotating optical waveguide is composed of a third faraday rotatory waveguide and a third half wave plate optical waveguide, which are connected in sequence, a polarization rotation angle of the third faraday rotatory waveguide is 45°, an angle between a main axis direction of the third half wave plate optical waveguide and the horizontal direction is −22.5°;

the second polarization rotating optical waveguide is configured to rotate polarization of an optical signal passing in a forward direction by 180° and rotate polarization of an optical signal passing in a reverse direction by 90°;

the third polarization rotating optical waveguide is configured to rotate polarization of an optical signal passing in a forward direction by 180° and rotate polarization of an optical signal passing in a reverse direction by −90°;

the third equal arm interferometer is configured such that the first signal optical component incident from one of two input ports of the fourth beam splitter emits from an output port of the fifth beam splitter, and such that the first interference optical signal incident from the output port of the fifth beam splitter emits from one of the two input ports of the fourth beam splitter;

the fourth equal arm interferometer is configured such that the second signal optical component incident from one of two input ports of the sixth beam splitter emits from an output port of the seventh beam splitter, and such that the third interference optical signal incident from the output port of the seventh beam splitter emits from one of the two input ports of the sixth beam splitter.

9. A polarization independent differential quadrature phase shift keying (DQPSK) demodulation integrated optical chip, comprising: a first beam splitter, a first polarization beam splitter rotator, a second polarization beam splitter rotator, a third polarization beam splitter rotator, a fourth polarization beam splitter rotator, a first quarter-wave plate, a first delayed optical waveguide, and four 45° polarization rotation structures, all of which are integrated on a same substrate, two output ports of the first beam splitter are respectively connected to one of two input ports of the first polarization beam splitter rotator and one of two input ports of the second polarization beam splitter rotator through a first optical waveguide and a second optical waveguide; two output ports of the first polarization beam splitter rotator are respectively connected to one of two input ports of the third polarization beam splitter rotator and one of two input ports of the fourth polarization beam splitter rotator through third optical waveguides provided with a 45° polarization rotation structure; two output ports of the second polarization beam splitter rotator are respectively connected to one of the two input ports of the third polarization beam splitter rotator and one of the two input ports of the fourth polarization beam splitter rotator through fourth optical waveguides provided with the 45° polarization rotation structure; two output ports of the third polarization beam splitter rotator are respectively connected to the fourth polarization beam splitter rotator through the first quarter-wave plate and the first delayed optical waveguide to form a delay polarization interferometer;

the first beam splitter is configured to split an input signal optical to generate a first signal optical component and a second signal optical component;

the first polarization beam splitter rotator is configured to perform a polarization beam splitting on the first signal optical component incident to one of the two input ports of the first polarization beam splitter rotator to generate a first polarization component and a second polarization component, both of which are transverse-electric (TE) polarized;

the second polarization beam splitter rotator is configured to perform the polarization beam splitting on the second signal optical component incident to one of the two input ports of the second polarization beam splitter rotator to generate a third polarization component and a fourth polarization component, both of which are TE polarized;

the 45° polarization rotation structure is configured to rotate polarization of an optical signal by 45°;

the delay polarization interferometer is configured to perform a polarization self-interference with TE polarization, in the delay polarization interferometer, on the first polarization component that is incident to one of the two input ports of the third polarization beam splitter rotator and is subjected to a 45° polarization rotation to generate a first interference component to be emitted from one of the two input ports of the fourth polarization beam splitter rotator; and to perform the polarization self-interference with TE polarization, in the delay polarization interferometer, on the first polarization component that is incident to one of the two input ports of the third polarization beam splitter rotator and is subjected to the 45° polarization rotation to generate a second interference component to be emitted from one of the two input ports of the fourth polarization beam splitter rotator;

the delay polarization interferometer is configured to perform a polarization self-interference with transverse-magnetic (TM) polarization, in the delay polarization interferometer on the first polarization component that is incident to one of the two input ports of the third polarization beam splitter rotator and is subjected to the 45° polarization rotation to generate a third interference component to be emitted from one of the two input ports of the fourth polarization beam splitter rotator; and to perform the polarization self-interference with TM polarization, in the delay polarization interferometer on the first polarization component that is incident to one of the two input ports of the third polarization beam splitter rotator and is subjected to the 45° polarization rotation to generate a fourth interference component to be emitted from one of the two input ports of the fourth polarization beam splitter rotator;

a main axis direction of the first quarter-wave plate has an angle of 0° with TE polarization, such that a phase of a TM polarized optical signal is increased by $\pi/2$, and a phase of a TE polarized optical signal remains unchanged when passing through the first quarter-wave plate;

the first delayed optical waveguide is configured to increase a delay of a passing optical signal by $\tau$;

the first polarization beam splitter rotator is further configured to perform a polarization and beam combination on the first interference component subjected to the 45° polarization rotation and the second interference component subjected to the 45° polarization rotation so that horizontal polarizations of the first interference component and the second interference component simultaneously emit from one of the two input ports of the first polarization beam splitter rotator to generate a first interference optical signal, and so that vertical polarization components of the first interference component and the second interference component simultaneously emit from one of the two input ports of the first polarization beam splitter rotator to generate a second interference optical signal;

the second polarization beam splitter rotator is further configured to perform the polarization and beam combination on the third interference component subjected to the 45° polarization rotation and the fourth interference component subjected to the 45° polarization rotation so that horizontal polarizations of the third interference component and the fourth interference component simultaneously emit from one of the two input ports of the second polarization beam splitter rotator to generate a third interference optical signal, and such that vertical polarization components of the third interference component and the fourth interference component simultaneously emit from one of the two input ports of the second polarization beam splitter rotator to generate a fourth interference optical signal.

10. The polarization independent DQPSK demodulation integrated optical chip according to claim 9, wherein the first optical waveguide is provided with a fifth polarization beam splitter rotator and a sixth polarization beam splitter rotator, the fourth optical waveguide is provided with a seventh polarization beam splitter rotator and an eighth polarization beam splitter rotator, two output ports of the fifth polarization beam splitter rotator are respectively connected to two input ports of the sixth polarization beam splitter rotator through fifth optical waveguides to form a first equal arm interferometer; two output ports of the seventh polarization beam splitter rotator are respectively connected to two input ports of the eighth polarization beam splitter rotator through sixth optical waveguides to form a second equal arm interferometer;

a notch groove is provided on seventh optical waveguides perpendicular to four arms of the first equal arm interferometer and the second equal arm interferometer;

a half wave plate and faraday rotatory plate, which are aligned and fitted with each other, are inserted into the notch groove, an angle between a main axis of the half wave plate and a horizontal direction are 22.5°, and a polarization rotation angle of the faraday rotatory plate is 45°;

the half wave plate and the faraday rotatory plate are configured to rotate polarization of an optical signal passing in a reverse direction by 90°, and maintain a polarization state of an optical signal passing in a forward direction unchanged;

the first equal arm interferometer is configured such that the first signal optical component incident from one of two input ports of the fifth polarization beam splitter rotator emits from an output port of the sixth polarization beam splitter rotator, and such that the first interference optical signal incident from the output port of the sixth polarization beam splitter rotator emits from one of the two output ports of the fifth polarization beam splitter rotator;

the second equal arm interferometer is configured such that the second signal optical component incident from one of two output ports of the seventh polarization beam splitter rotator emits from an output port of the eighth polarization beam splitter rotator, and such that the third interference optical signal incident from the output port of the eighth polarization beam splitter rotator emits from one of the two output ports of the seventh polarization beam splitter rotator.

11. The polarization independent DQPSK demodulation integrated optical chip according to claim 9, wherein the first optical waveguide is provided with a fifth polarization beam splitter rotator and a sixth polarization beam splitter rotator, the second optical waveguide is provided with a seventh polarization beam splitter rotator and an eighth polarization beam splitter rotator, two output ports of the fifth polarization beam splitter rotator are respectively connected to two input ports of the sixth polarization beam splitter rotator through fifth optical waveguides to form a first equal arm interferometer; two output ports of the seventh polarization beam splitter rotator are respectively connected to two input ports of the eighth polarization beam splitter rotator through sixth optical waveguides to form a second equal arm interferometer;

a first polarization rotating optical waveguide is provided on each of seventh optical waveguides of four arms of the first equal arm interferometer and the second equal arm interferometer;

the first polarization rotating optical waveguide is composed of a first half wave plate optical waveguide and a first faraday rotatory waveguide, which are connected in sequence, an angle between a main axis direction of the first half wave plate optical waveguide and a horizontal direction is 22.5°, and a polarization rotation angle of the first faraday rotatory waveguide is 45°;

the first polarization rotating optical waveguide is configured to rotate polarization of an optical signal passing in a reverse direction by 90°, and maintain a polarization state of an optical signal passing in a forward direction unchanged;

the first equal arm interferometer is configured such that the first signal optical component incident from one of two input ports of the fifth polarization beam splitter rotator emits from an output port of the sixth polarization beam splitter rotator, and such that the first interference optical signal incident from the output port of the sixth polarization beam splitter rotator emits from one of the two input ports of the fifth polarization beam splitter rotator;

the second equal arm interferometer is configured such that the second signal optical component incident from one of two input ports of the seventh polarization beam splitter rotator emits from an output port of the eighth polarization beam splitter rotator, and such that the third interference optical signal incident from the output port of the eighth polarization beam splitter rotator emits from one of the two input ports of the seventh polarization beam splitter rotator.

12. The polarization independent DQPSK demodulation integrated optical chip according to claim 9, wherein the first optical waveguide is provided with a fourth beam splitter and a fifth beam splitter, the second optical waveguide is provided with a sixth beam splitter and a seventh beam splitter;

two output ports of the fourth beam splitter are respectively connected to two input ports of the fifth beam splitter through fifth optical waveguides to form a third equal arm interferometer; two output ports of the sixth beam splitter are respectively connected to two input ports of the seventh beam splitter through sixth optical waveguides to form a fourth equal arm interferometer;

a second polarization rotating optical waveguide is provided on each of seventh optical waveguides of upper arms of the third equal arm interferometer and the fourth equal arm interferometer; a third polarization rotating optical waveguide is provided on each of eighth optical waveguides of lower arms of the third equal arm interferometer and the fourth equal arm interferometer;

the second polarization rotating optical waveguide is composed of a second half wave plate optical waveguide and a second faraday rotatory waveguide, which are connected in sequence, an angle between a main axis direction of the second half wave plate optical waveguide and a horizontal direction is 22.5°, and a polarization rotation angle of the second faraday rotatory waveguide is 45°;

the third polarization rotating optical waveguide is composed of a third faraday rotatory waveguide and a third half wave plate optical waveguide, which are connected in sequence, a polarization rotation angle of the third faraday rotatory waveguide is 45°, an angle between a main axis direction of the third half wave plate optical waveguide and the horizontal direction is −22.5°;

the second polarization rotating optical waveguide is configured to rotate polarization of an optical signal passing in a forward direction by 180° and rotate polarization of an optical signal passing in a reverse direction by 90°;

the third polarization rotating optical waveguide is configured to rotate polarization of an optical signal passing in a forward direction by 180° and rotate polarization of an optical signal passing in a reverse direction by −90°;

the third equal arm interferometer is configured such that the first signal optical component incident from one of two input ports of the fourth beam splitter emits from an output port of the fifth beam splitter, and such that the first interference optical signal incident from the output port of the fifth beam splitter emits from one of the two input ports of the fourth beam splitter;

the fourth equal arm interferometer is configured such that the second signal optical component incident from one of two input ports of the sixth beam splitter emits from an output port of the seventh beam splitter, and such that the third interference optical signal incident from the output port of the seventh beam splitter emits from one of the two input ports of the sixth beam splitter.

* * * * *